(12) United States Patent
Lee et al.

(10) Patent No.: US 10,178,575 B2
(45) Date of Patent: Jan. 8, 2019

(54) METHOD AND APPARATUS FOR SUPPORTING FULL-DUPLEX COMMUNICATION OPERATION IN WIRELESS COMMUNICATION SYSTEM SUPPORTING FULL-DUPLEX COMMUNICATION

(71) Applicant: LG ELECTRONICS INC., Seoul (KR)

(72) Inventors: Eunjong Lee, Seoul (KR); Jaehoon Chung, Seoul (KR); Genebeck Hahn, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 15/307,715

(22) PCT Filed: Nov. 17, 2014

(86) PCT No.: PCT/KR2014/011034
§ 371 (c)(1),
(2) Date: Oct. 28, 2016

(87) PCT Pub. No.: WO2015/167096
PCT Pub. Date: Nov. 5, 2015

(65) Prior Publication Data
US 2017/0048741 A1    Feb. 16, 2017

Related U.S. Application Data

(60) Provisional application No. 61/985,480, filed on Apr. 29, 2014.

(51) Int. Cl.
*H04W 4/00*       (2018.01)
*H04W 24/10*    (2009.01)
(Continued)

(52) U.S. Cl.
CPC .............. *H04W 24/10* (2013.01); *H04L 5/14* (2013.01); *H04L 41/08* (2013.01); *H04W 76/10* (2018.02);
(Continued)

(58) Field of Classification Search
CPC combination set(s) only.
See application file for complete search history.

(56) References Cited

U.S. PATENT DOCUMENTS 8,817,641 B2 *   8/2014   Choi ................... H04W 16/14
                                                                  370/241
8,842,546 B2 *   9/2014   Chen ................... H04W 36/08
                                                                  370/241
(Continued)

FOREIGN PATENT DOCUMENTS

EP          3125632 A1     2/2017
JP          2009-505538 A  2/2009
(Continued)

OTHER PUBLICATIONS

CMCC, Discussion on full/non-full duplex UE for TDD-FDD CA, R1-140591, 3GPP TSG RAN WG1 Meeting #76, Prague, Czech Republic, Feb. 10-14, 2014 (http://www.3gpp.org/ftp/tsg_ran/wg1_r11/TSGR1_76/Docs/R1-140591.zip), 5 pgs.

*Primary Examiner* — Frank Duong
(74) *Attorney, Agent, or Firm* — Birch, Stewart, Kolasch & Birch, LLP

(57) ABSTRACT

A method for performing a Full-Duplex Radio (FDR) operation in a wireless communication system that supports the FDR is disclosed. The method includes exchanging FDR capability information that represents whether to have a capability of performing the FDR operation between a user equipment (UE) and a base station (BS); receiving, by the UE, Inter-Device-Interference (IDI) measurement configuration information from the BS; performing, by the UE, an
(Continued)

IDI measurement based on the received IDI measurement configuration information; reporting, by the UE, a result of the IDI measurement to the BS; and receiving, by the UE, a control message notifying that the UE is included in a group related to the FDR operation from the BS, where the FDR capability information includes indication information that represents whether to support an FDR mode that transmission and reception operations are available to be performed simultaneously using an identical radio resource.

10 Claims, 19 Drawing Sheets

(51) Int. Cl.
*H04W 76/10* (2018.01)
*H04W 76/27* (2018.01)
*H04L 5/14* (2006.01)
*H04L 12/24* (2006.01)
*H04W 8/00* (2009.01)
*H04W 88/02* (2009.01)

(52) U.S. Cl.
CPC ............ *H04W 76/27* (2018.02); *H04W 8/005* (2013.01); *H04W 88/02* (2013.01)

(56) References Cited

U.S. PATENT DOCUMENTS

| | | | |
|---|---|---|---|
| 8,983,448 B2* | 3/2015 | Jang | H04W 36/20 |
| | | | 455/420 |
| 9,426,682 B2* | 8/2016 | Sun | H04W 72/082 |
| 2011/0038283 A1 | 2/2011 | Yu et al. | |
| 2011/0103221 A1 | 5/2011 | Lee et al. | |
| 2012/0063369 A1 | 3/2012 | Lin et al. | |
| 2012/0201173 A1 | 8/2012 | Jain et al. | |
| 2013/0051288 A1 | 2/2013 | Yamada et al. | |
| 2013/0150106 A1 | 6/2013 | Bucknell et al. | |
| 2014/0003262 A1 | 1/2014 | He et al. | |
| 2015/0326269 A1* | 11/2015 | Ko | H04B 1/525 |
| | | | 375/219 |

FOREIGN PATENT DOCUMENTS

| | | | |
|---|---|---|---|
| JP | 2012-134600 A | | 7/2012 |
| WO | WO 2013/111422 A1 | | 8/2013 |
| WO | WO 2013/134930 | * | 9/2013 |
| WO | WO 2013/134930 A1 | | 9/2013 |
| WO | WO 2013/178084 A1 | | 12/2013 |
| WO | WO 2014/014326 A1 | | 1/2014 |

* cited by examiner

[Figure 1]
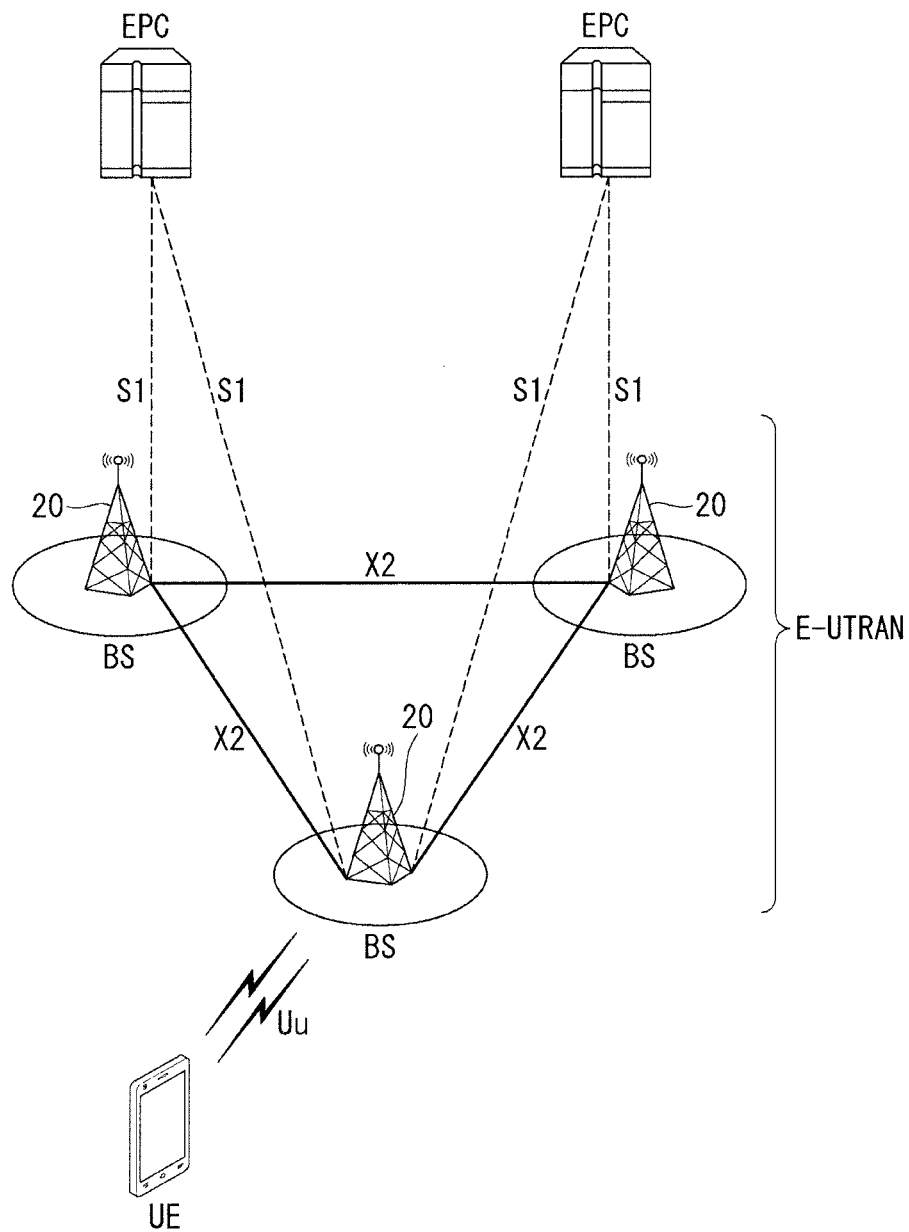

【Figure 2】
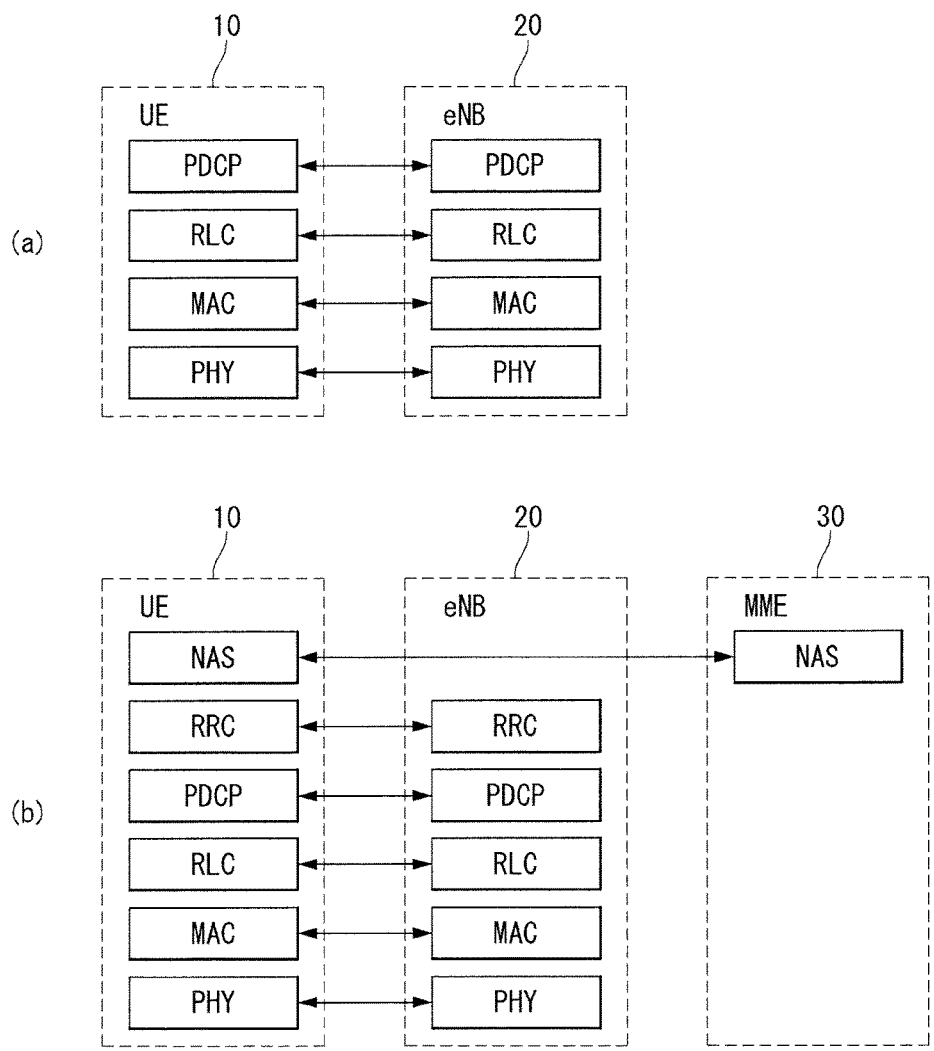

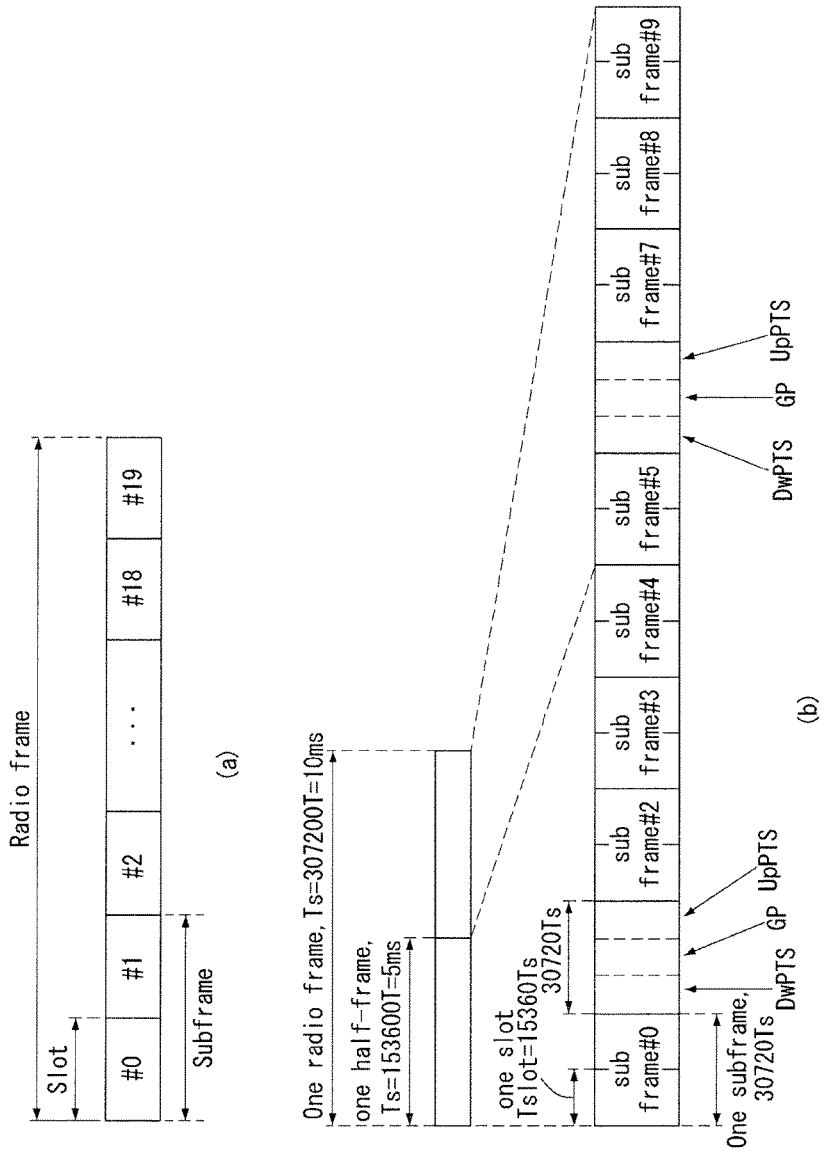

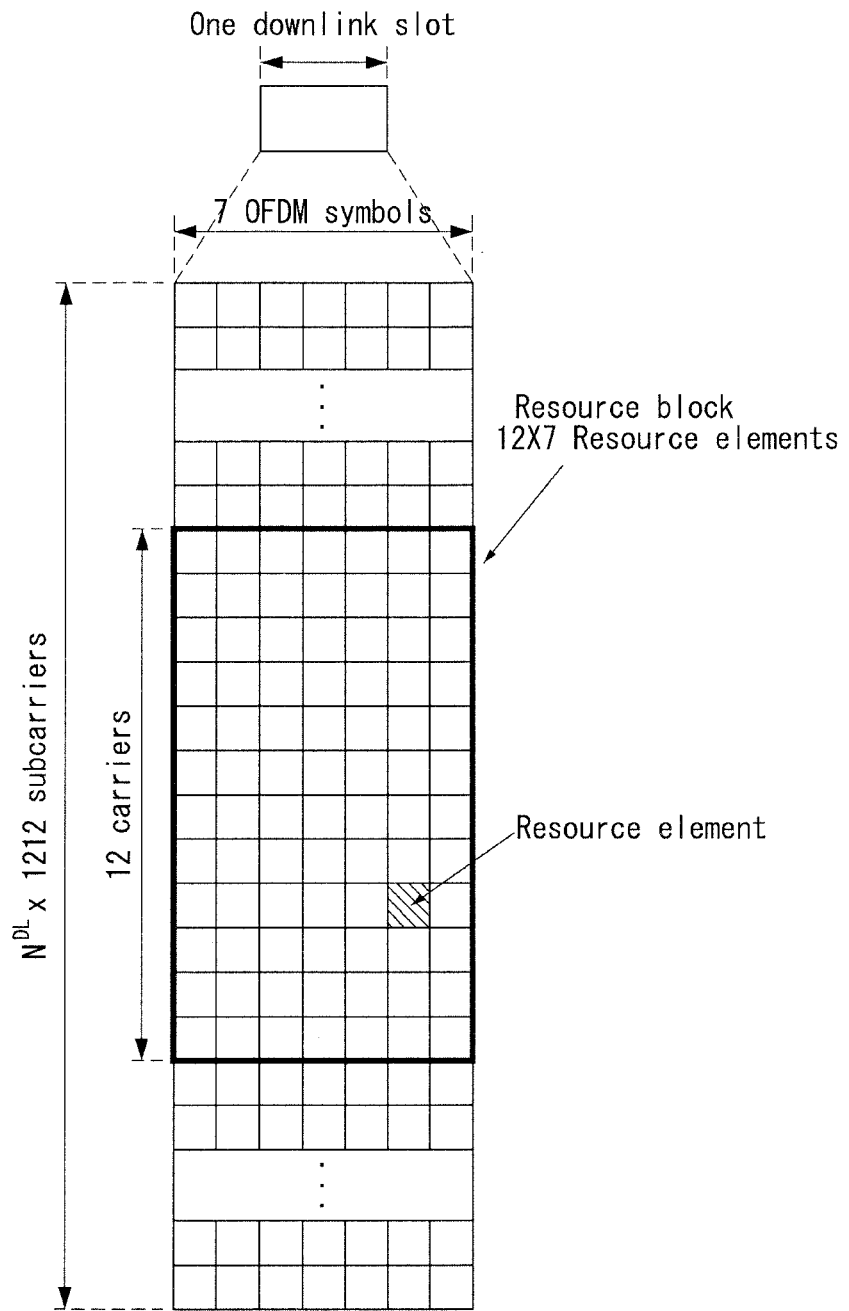
[Figure 4]

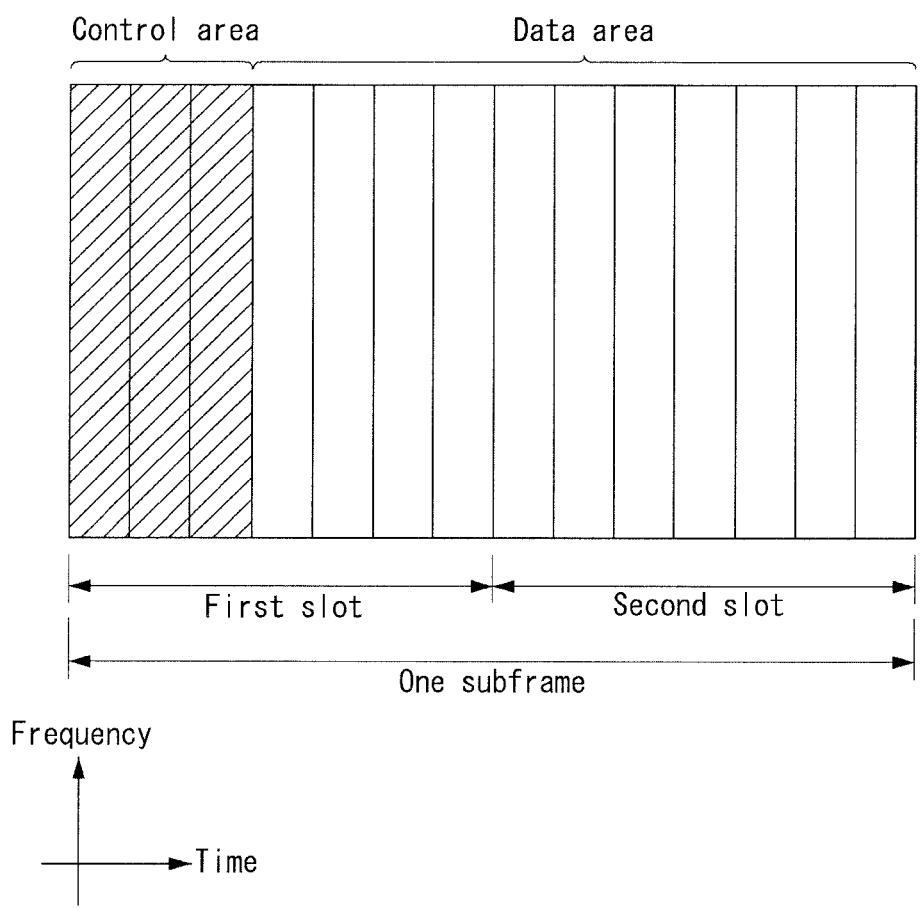
[Figure 5]

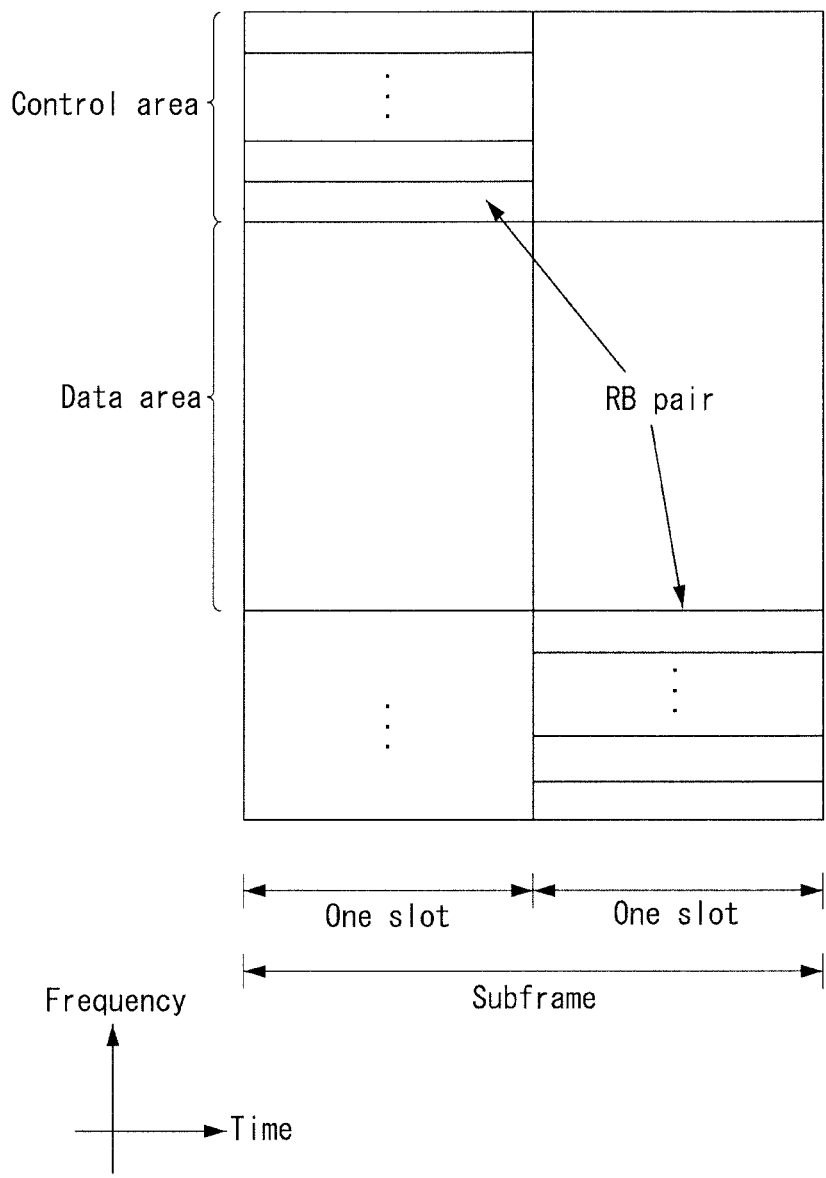
[Figure 6]

[Figure 7]
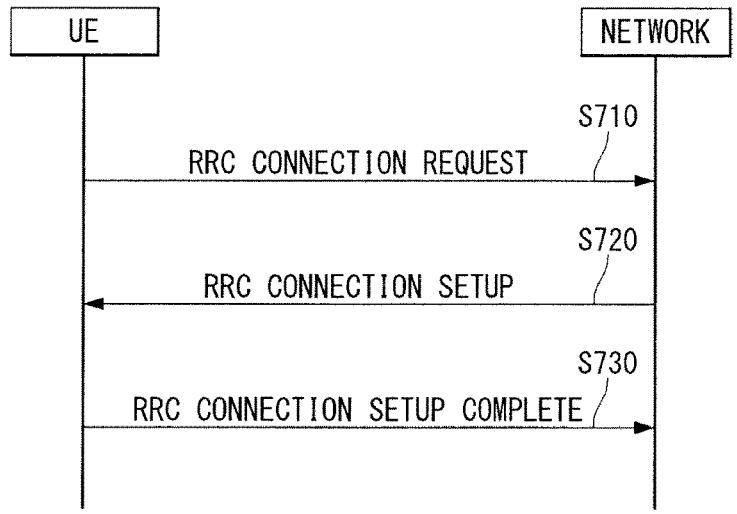
[Figure 8]
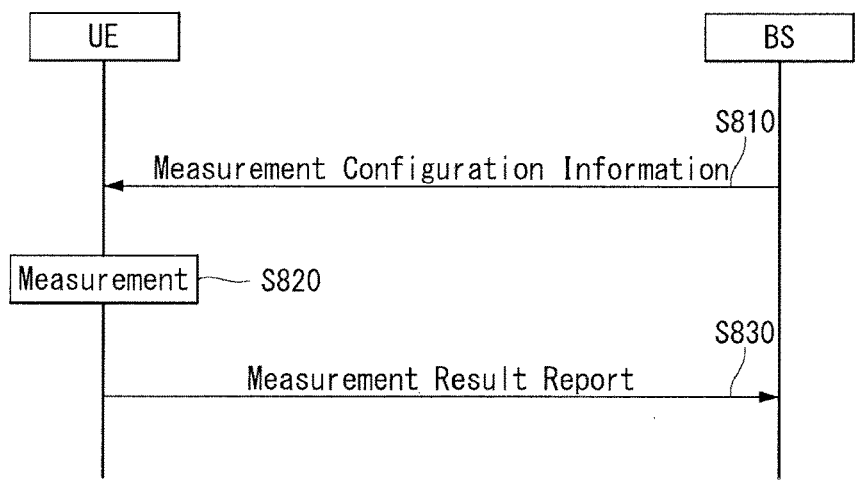
[Figure 9]
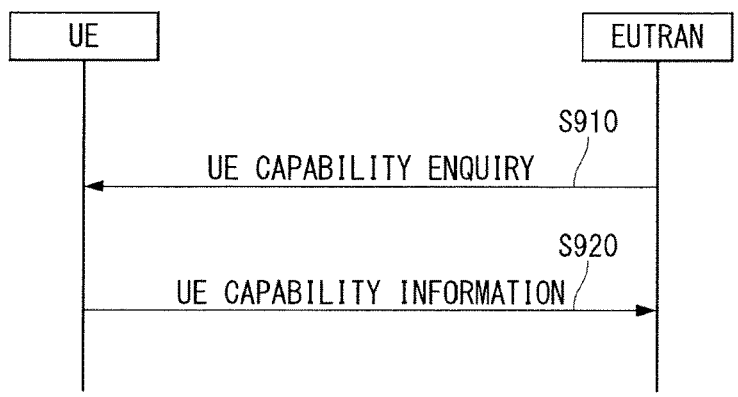

[Figure 10]
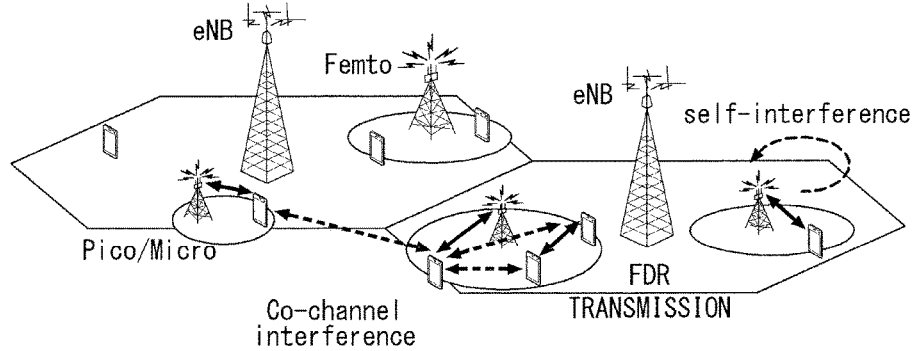
[Figure 11]
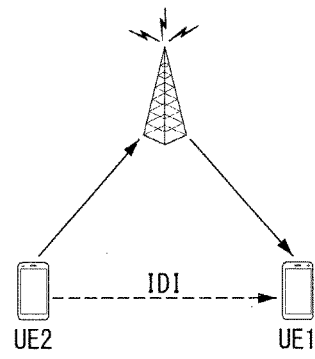
(a)
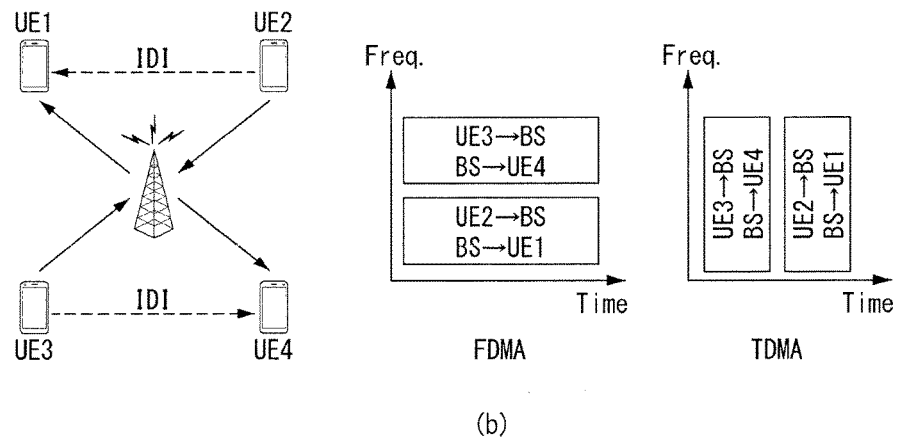
(b)

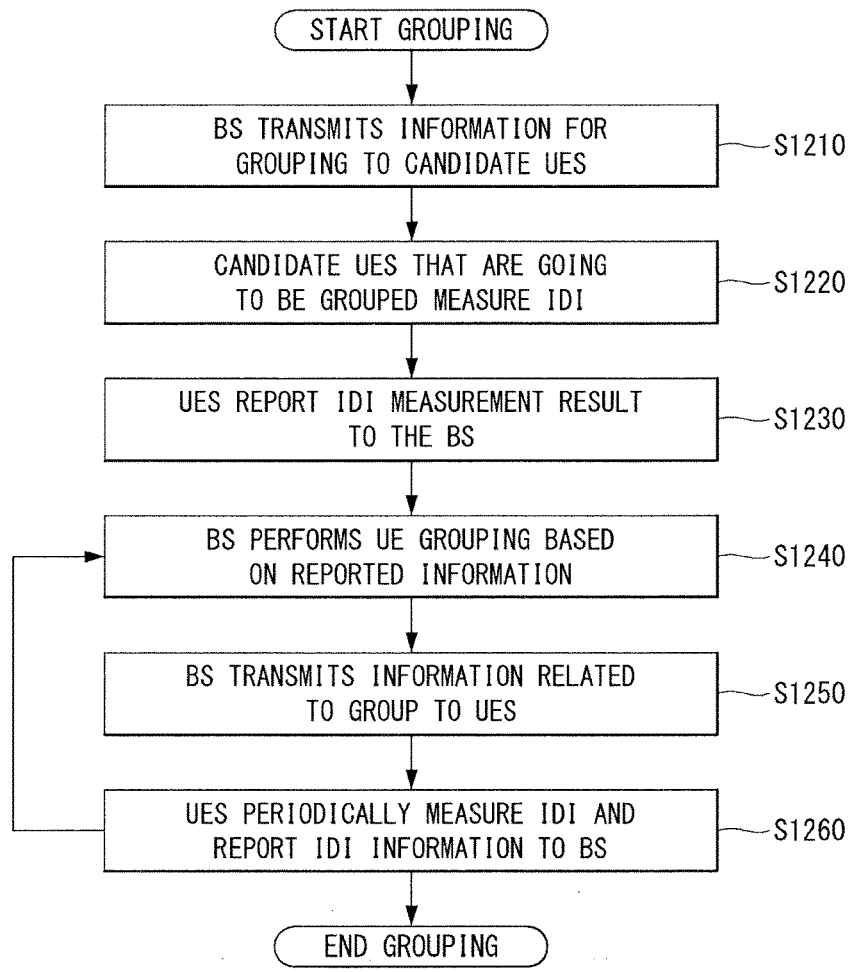
【Figure 12】
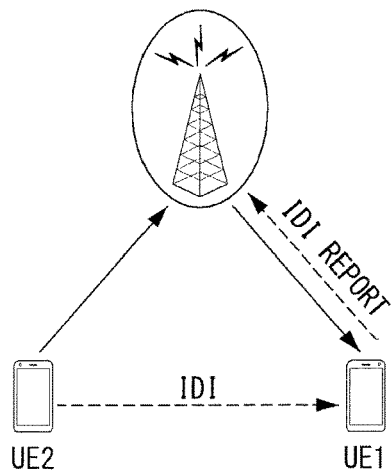
【Figure 13】

[Figure 14]
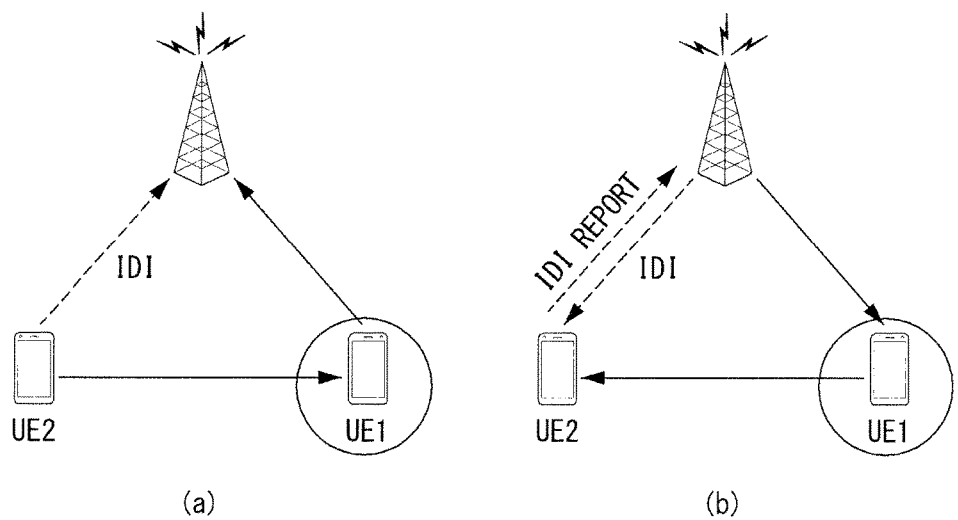
(a)　　　　　　　　　　(b)
[Figure 15]
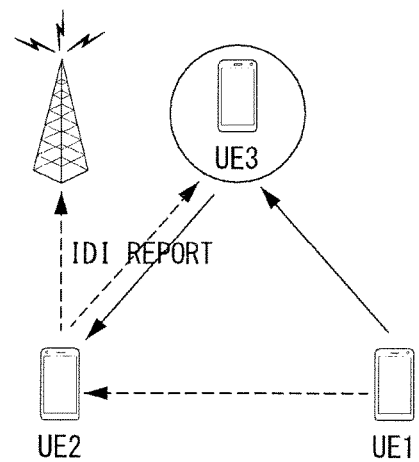

【Figure 16】
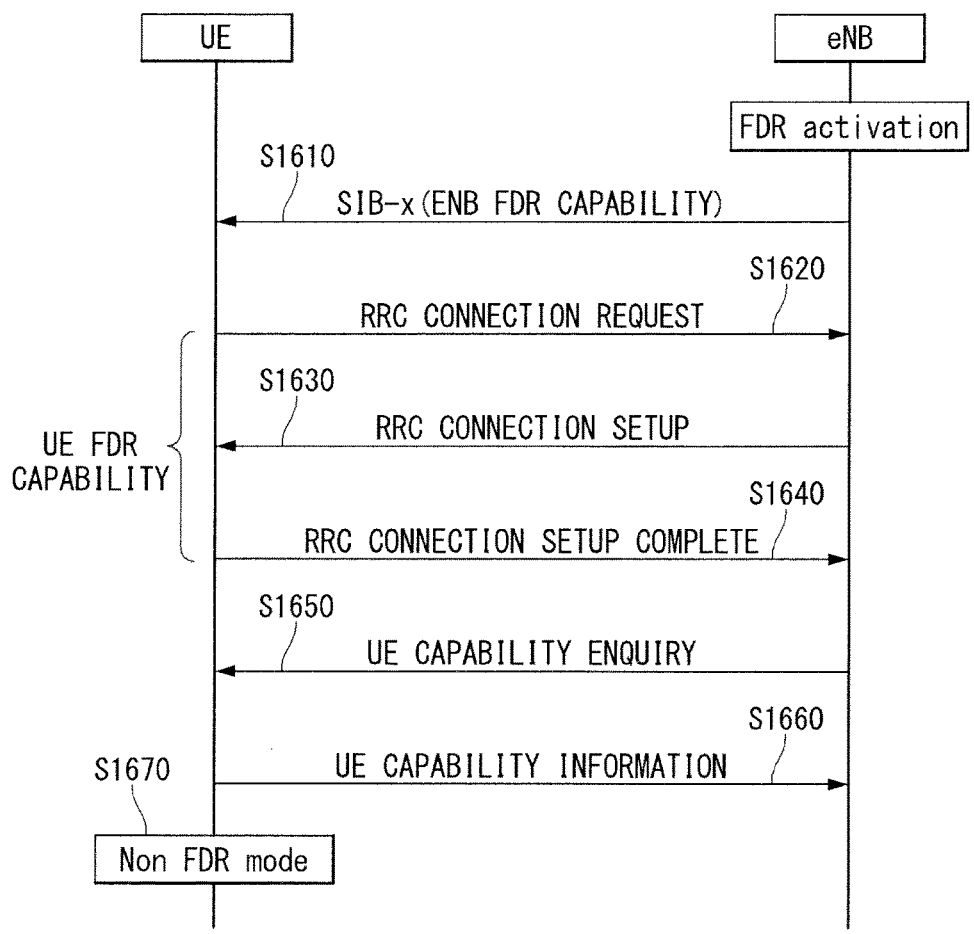

[Figure 17]
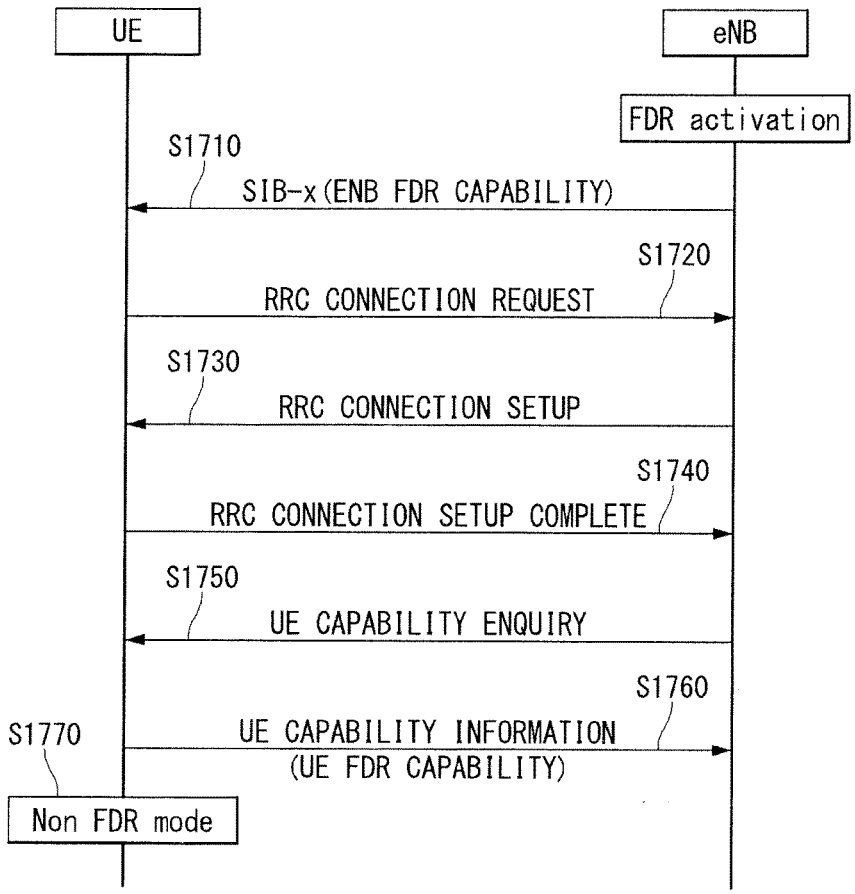
[Figure 18]
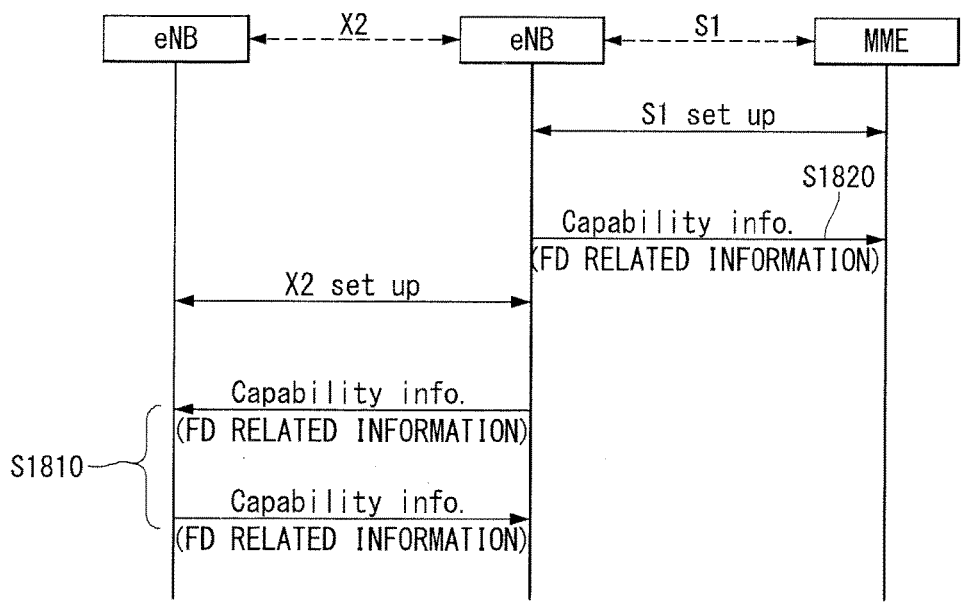

[Figure 19]
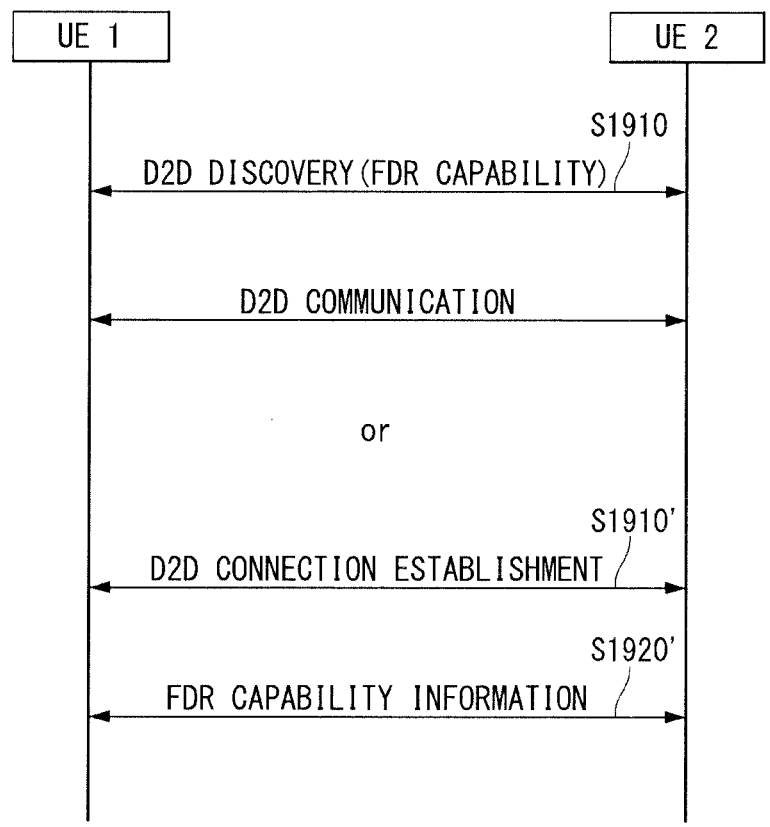

[Figure 20]
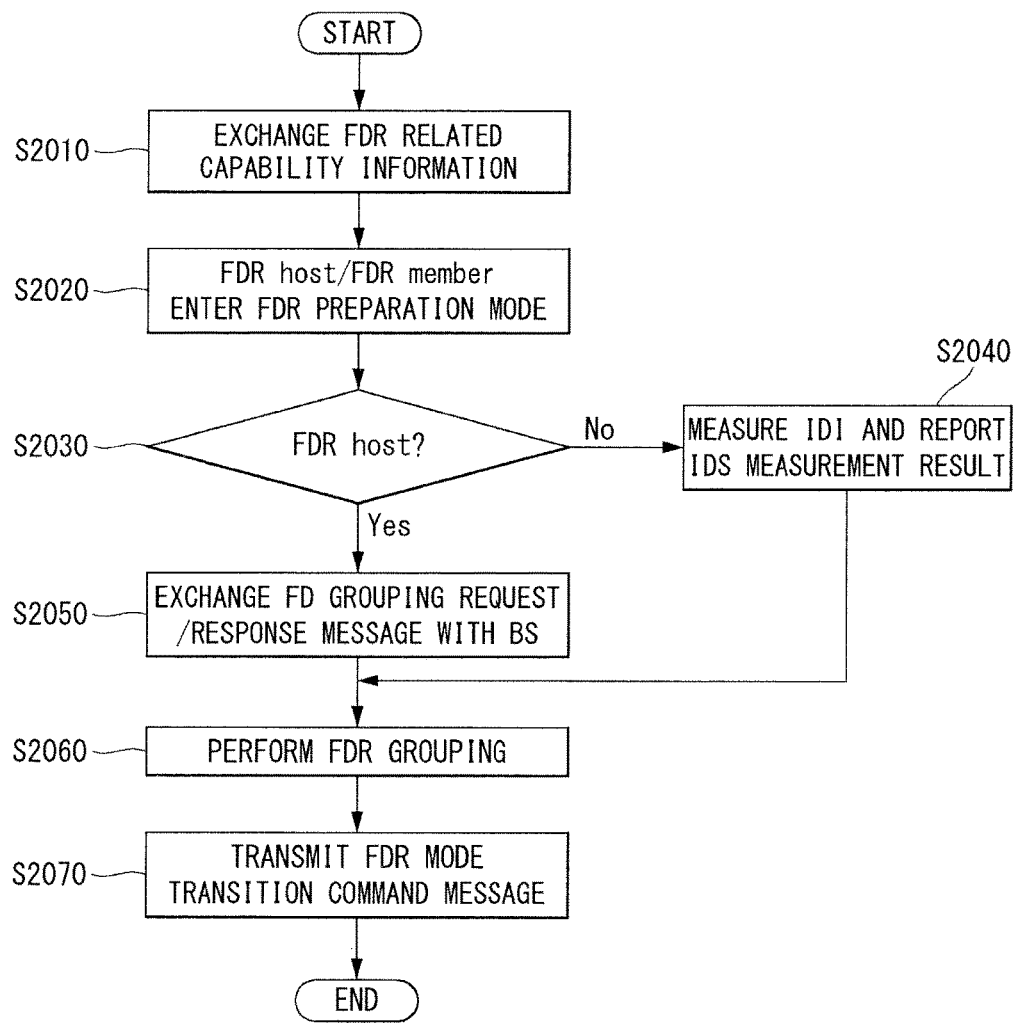

[Figure 21]
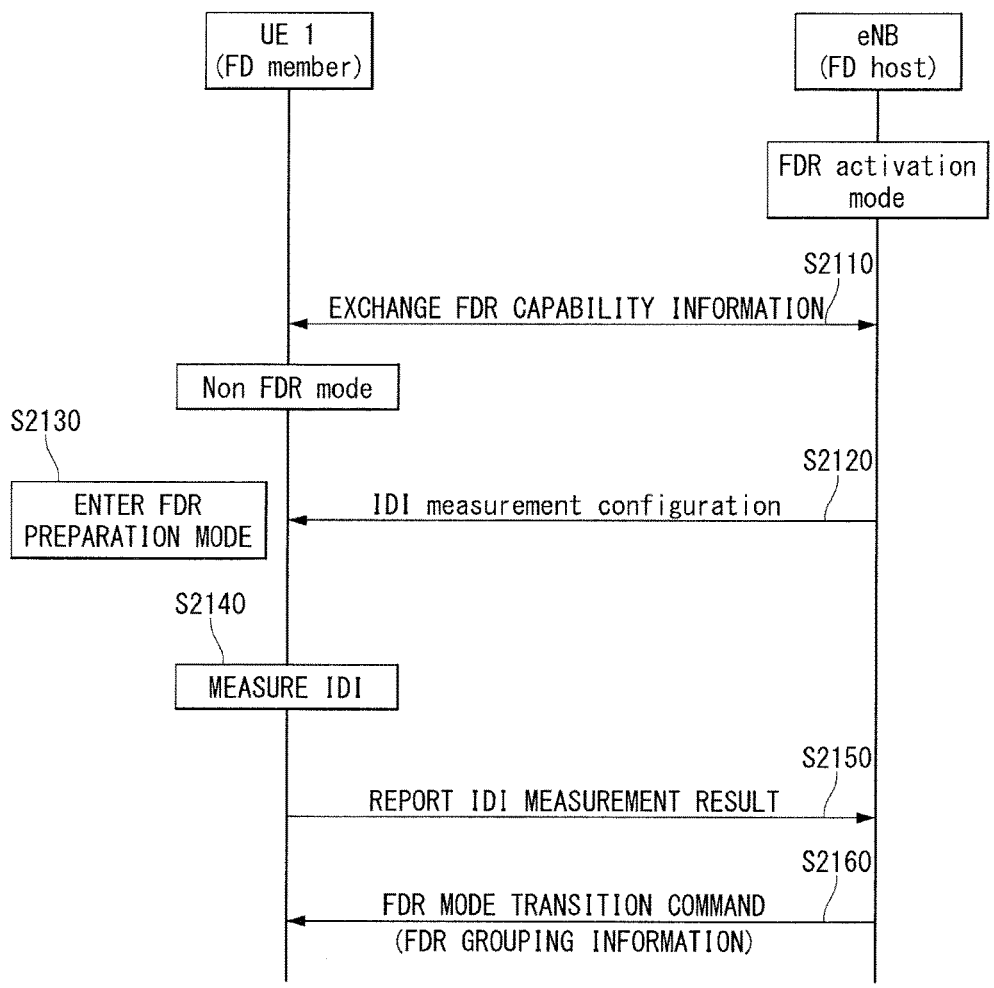

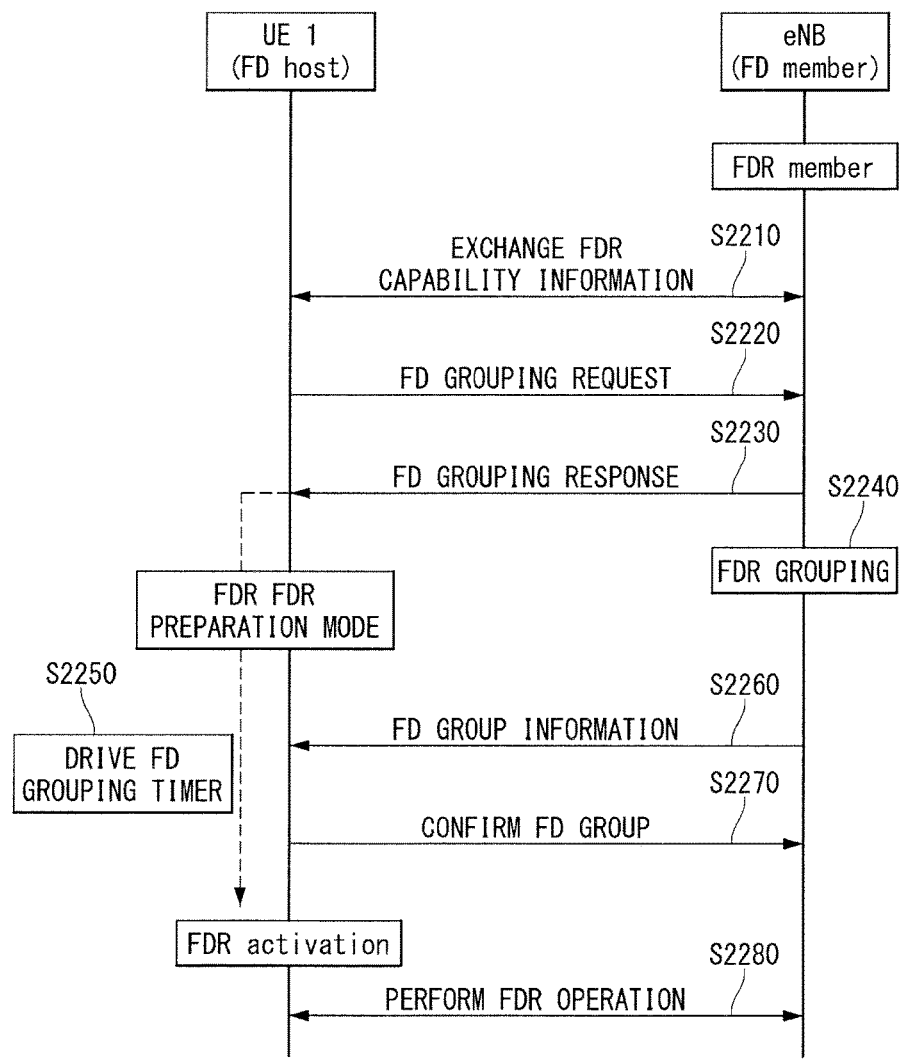
[Figure 22]

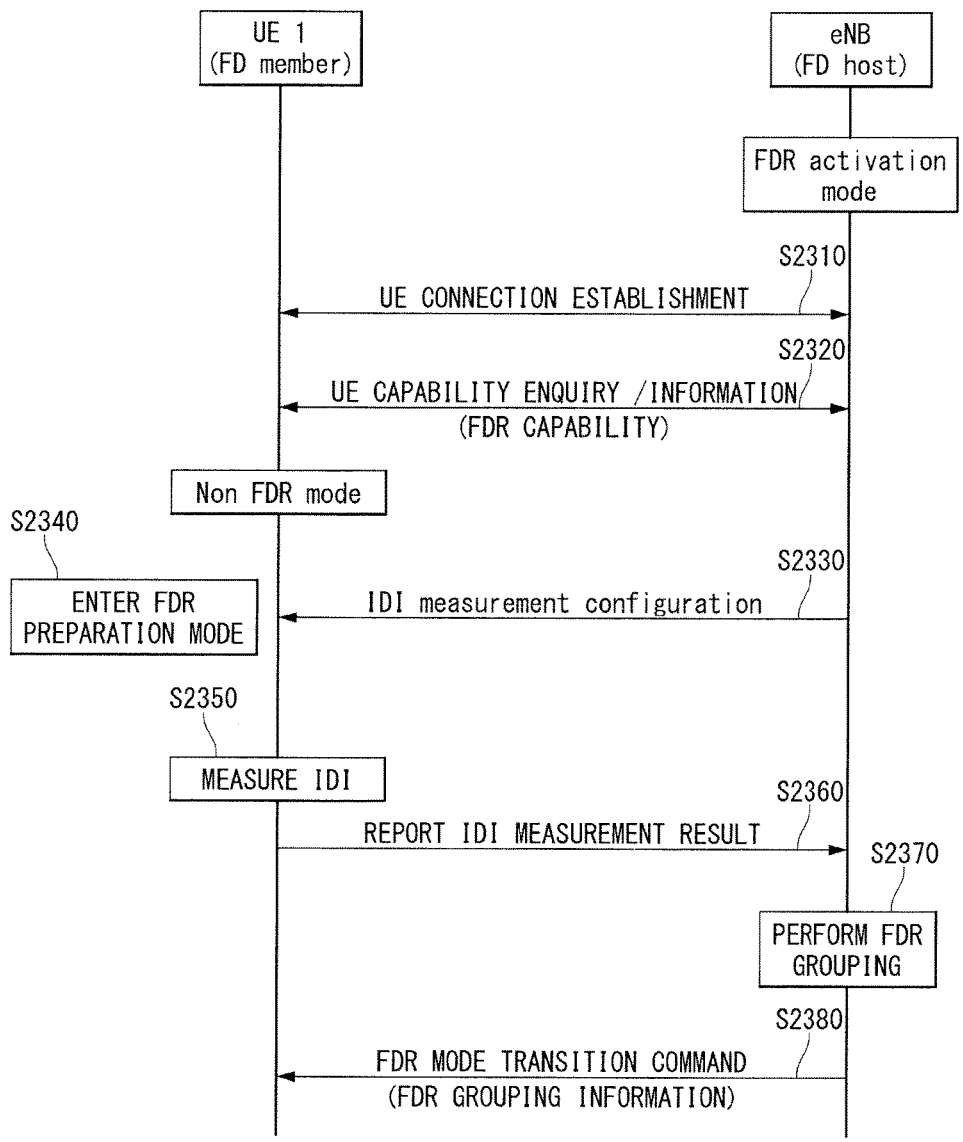
[Figure 23]

[Figure 24]
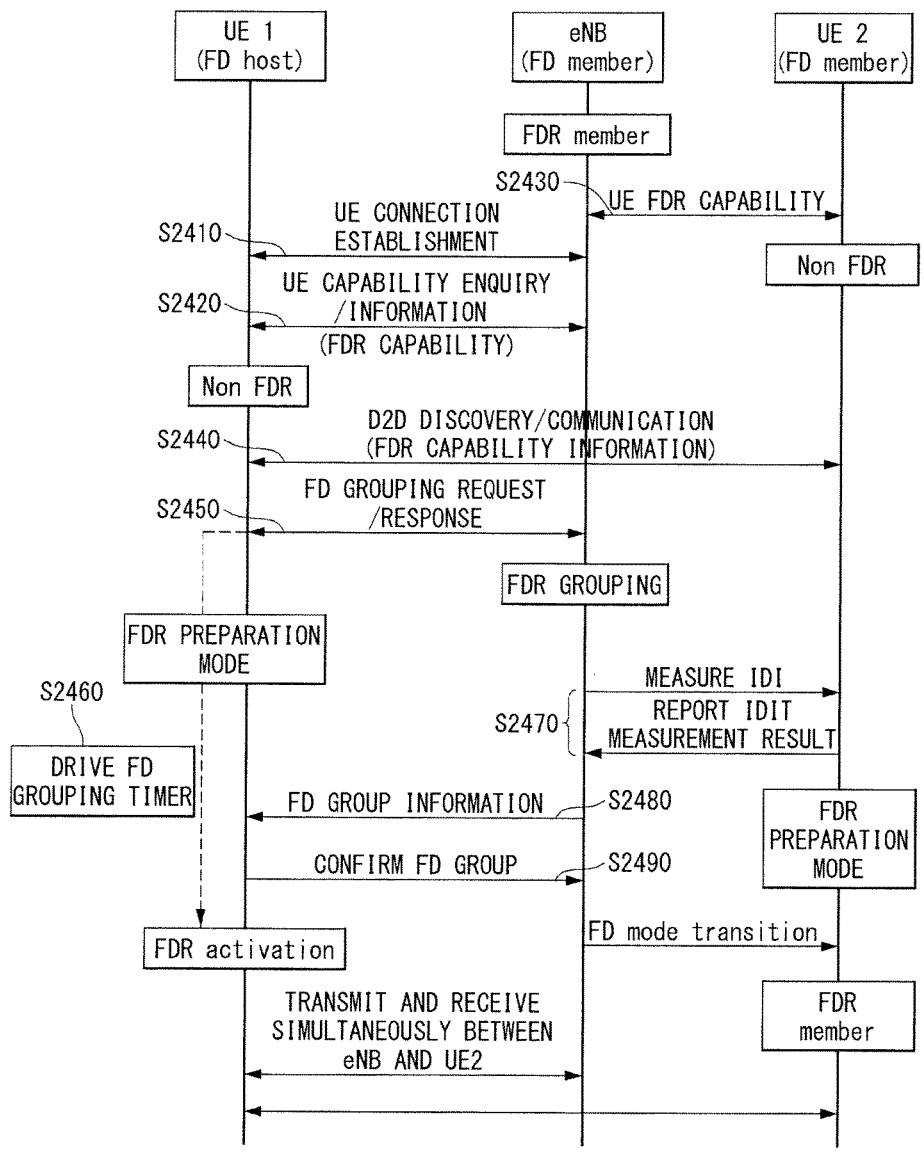

[Figure 25]
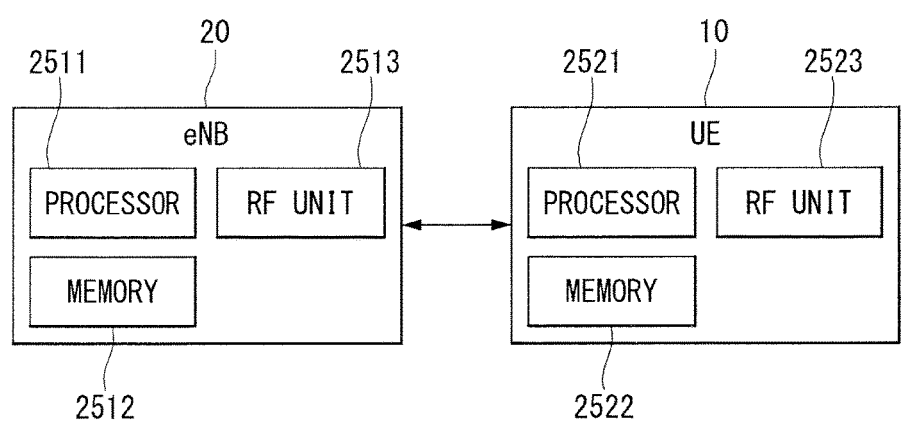

METHOD AND APPARATUS FOR SUPPORTING FULL-DUPLEX COMMUNICATION OPERATION IN WIRELESS COMMUNICATION SYSTEM SUPPORTING FULL-DUPLEX COMMUNICATION

CROSS-REFERENCE TO RELATED APPLICATIONS

This application is the National Phase of PCT International Application No. PCT/KR2014/011034, filed on Nov. 17, 2014, which claims priority under 35 U.S.C. 119(e) to U.S. Provisional Application No. 61/985,480, filed on Apr. 29, 2014, all of which are hereby expressly incorporated by reference into the present application.

TECHNICAL FIELD

The present invention relates to a method and apparatus for supporting a full duplex radio (FDR) operation in a wireless communication system that supports the FDR.

BACKGROUND ART

3rd Generation Partnership Project (3GPP) long term evolution (LTE), which is an improvement of Universal Mobile Telecommunications System (UMTS), is introduced as 3GPP release 8. 3GPP LTE uses orthogonal frequency division multiple access (OFDMA) in downlink and uses Single Carrier-frequency division multiple access (SC-FDMA) in uplink. 3GPP LTE adopts the multiple input multiple output (MIMO) that has four antennas to the maximum. Recently, 3GPP LTE-Advanced (LTE-A), which is an evolution of 3GPP, has been discussed.

In a wireless communication system that supports the FDR, the device grouping is used as a method for efficiently performing the FDR operation of an FDR capability device, that is, for mitigating Inter-Device-Interference (IDI).

The device grouping is defined to be performed by a device through the IDI measurement, and the FDR capability device measures interference of neighboring devices according to the instruction of a base station, and reports it to the base station.

DISCLOSURE

Technical Problem

In order to perform the device grouping more efficiently in the FDR system, a base station is required to instruct for only an FDR capability device to measure interference of neighboring devices.

However, a method for the base station to know which device is the FDR capability device has not been defined.

In addition, even though it is the FDR capability device, as occasion demands, it has not been defined for a specific method for performing the FDR operation, or not performing the FDR operation.

That is, it has not been defined for a specific method when the device grouping is started and when the device is excluded from the corresponding group.

Accordingly, an object of the present specification is to provide a method for exchanging the capability information related to the FDR operation in order to perform the FDR grouping efficiently.

In addition, another object of the present specification is to define particular FDR operation procedure and various FDR operation modes in order to perform the FDR operation efficiently.

The technical objects to attain in the present disclosure are not limited to the above-described technical objects and other technical objects which are not described herein will become apparent to those skilled in the art from the following description.

Technical Solution

In an aspect of the present specification, a method for performing a Full-Duplex Radio (FDR) operation in a wireless communication system that supports the FDR is disclosed. The method includes exchanging FDR capability information that represents whether to have a capability of performing the FDR operation between a user equipment (UE) and a base station (BS); receiving, by the UE Inter-Device-Interference (IDI) measurement configuration information from the BS; performing, by the UE, an IDI measurement based on the received IDI measurement configuration information; reporting, by the UE, a result of the IDI measurement to the BS; and receiving, by the UE, a control message notifying that the UE is included in a group related to the FDR operation from the BS, where the FDR capability information includes indication information that represents whether to support an FDR mode that transmission and reception operations are available to be performed simultaneously using an identical radio resource.

In addition, in the present specification, the BS is an FDR host that performs the FDR operation in the FDR mode, and the UE is an FDR member that assists the FDR host.

In addition, in the present specification, the method further includes entering, by the UE, an FDR preparation mode, when the UE receives the IDI measurement configuration information; and entering, by the UE, an FDR member mode after ending the FDR preparation mode, when the UE receives the control message.

In addition, in the present specification the FDR capability information includes at least one of FD assist indication information that represents whether it is available to operate as the FDR member by participating in the group, information that represents an operation method in the FDR mode or information related to an FDR grouping method.

In addition, in the present specification, the control message further includes information related to an FDR grouping.

In addition, in the present specification, exchanging the FDR capability information includes: receiving, by the UE, system information that includes the FDR capability information of the BS; and transmitting, by the UE, the FDR capability information of the UE to the BS through a Radio Resource Control (RRC) connection establishment procedure.

In addition, in the present specification, exchanging the FDR capability information includes: receiving, by the UE, system information that includes the FDR capability information of the BS; and transmitting, by the UE, the FDR capability information of the UE to the BS through a UE capability negotiation procedure.

In addition, in the present specification, the FDR capability information of the UE is included in an RRC connection request message or an RRC connection setup complete message.

In addition, in the present specification, the FDR capability information of the UE is included in UE capability information.

In another aspect of the present specification, a method for performing a Full-Duplex Radio (FDR) operation in a wireless communication system that supports the FDR is disclosed. The method includes exchanging FDR capability information that represents whether to have a capability of performing the FDR operation; transmitting, from a first user equipment (UE) to a base station (BS), a first message for requesting of performing the FDR operation; transmitting, from the BS to the first UE, a second message in response to the first message; transmitting, from the BS to a second UE, Inter-Device-Interference (IDI) measurement configuration information; reporting, from the second UE to the BS, a result of the IDI measurement; transmitting, from the BS to the first UE, information of a group related to the FDR operation; transmitting, from the first UE to the BS, a third message in response to the information of the group; and transmitting, from the BS to the second UE, a fourth message notifying that the second UE is included in the group.

In addition, in the present specification, the first UE is an FDR host that performs the FDR operation in the FDR mode, and the BS and the second UE are FDR members that assist the FDR host.

In addition, in the present specification, the method further includes entering, by the first UE, an FDR preparation mode, when the first UE receives the second message; and entering, by the first UE, an FDR member mode after ending the FDR preparation mode, when the first UE receives the information of the group or the third message.

In addition, in the present specification, the method further includes driving, by the first UE, an FD grouping timer related to receiving the information of the group, when the first UE receives the second message; and terminating, by the first UE, the FD grouping timer, when a termination condition of the FD grouping timer is satisfied.

In addition, in the present specification, the termination condition of the FD grouping timer is a reception of the information of the group, an expiration of the FD grouping timer or an expiration of an RRC related timer, and the first UE drives the RRC related timer, when transmitting the first message.

In addition, in the present specification, the method further includes entering, by the second UE, an FDR member mode, when receiving the fourth message.

In addition, in the present specification, exchanging the FDR capability information includes: exchanging the FDR capability information between the first UE and the BS; exchanging the FDR capability information between the first UE and the second UE; and exchanging the FDR capability information between the BS and the second UE.

In addition, in the present specification, exchanging the FDR capability information between the first UE and the BS includes: transmitting, from the BS to the first UE, system information including the FDR capability information of the BS; and transmitting, from the first UE to the BS, the FDR capability information of the first UE through an RRC connection establishment procedure or a UE capability negotiation procedure.

In addition, in the present specification, the exchanging the FDR capability information between the first UE and the second UE is performed through a Device-to-Device (D2D) discovery procedure or a D2D communication procedure.

In addition, in the present specification, the second UE measures the IDI with a shorter period than a threshold value for a UE within the group in the FDR member mode, and measures the IDI with a longer period than the threshold value for a UE outside of the group.

In addition, in the present specification, the method further includes performing, by the second UE, the IDI measurement based on the received IDI measurement configuration information.

In addition, in the present specification, the first message is an FDR grouping request message, the second message is an FDR grouping response message, the third message is an FD group confirm message, and the fourth message is an FDR mode transition command message.

Technical Effects

According to the present specification, there is an effect for a base station to efficiently perform the FDR grouping by instructing to measure the IDI measurement only for the devices having FDR capability by newly defining a procedure of exchanging the FDR related capability information.

That is, the present specification may be implemented to prevent a device not having the FDR capability from unnecessarily measuring interference on a neighboring device and reporting it to a base station.

In addition, according to the present specification, detailed methods related to the FDR operation in the FDR system are newly defined, and therefore, the inter-device-interference is minimized and the devices are efficiently grouped.

The technical effects of the present disclosure are not limited to the technical effects described above, and other technical effects not mentioned herein may be understood to those skilled in the art from the description below.

DESCRIPTION OF DRAWINGS

The accompanying drawings, which are included herein as a part of the description for helping understanding the present invention, provide embodiments of the present invention, and describe the technical features of the present invention with the description below.

FIG. 1 illustrates a wireless communication system to which the present invention may be applied.

FIG. 2a illustrates an example of radio protocol architecture for control plane and FIG. 2b illustrates an example of radio protocol architecture for user plane.

FIG. 3 illustrates an example of radio protocol architecture in 3GPP LTE-A.

FIG. 4 is a diagram illustrating a resource grid for a downlink slot.

FIG. 5 illustrates a structure of downlink subframe.

FIG. 6 illustrates a structure of uplink subframe.

FIG. 7 is a flowchart illustrating a procedure of establishing the RRC connection to which the present invention may be applied.

FIG. 8 illustrates a flowchart illustrating an example of a method for performing measurement to which the present invention may be applied.

FIG. 9 is a flowchart illustrating an example of the UE capability negotiation procedure.

FIG. 10 is a conceptual diagram illustrating an example of the Full-Duplex Radio system.

FIG. 11 is a conceptual diagram illustrating an example of the IDI occurred in the FDR system.

FIG. 12 is a flowchart illustrating an example of the UE grouping method.

FIG. 13 is a conceptual diagram illustrating an example of the FDR scenario proposed in the present specification.

FIG. 14 illustrates another example of the FDR scenario proposed in the present specification.

FIG. 15 illustrates another example of the FDR scenario proposed in the present specification.

FIG. 16 illustrates an example of a method for exchanging the FDR related capability information through an initial access procedure proposed in the present specification.

FIG. 17 illustrates an example of a method for exchanging the FDR related capability information through the UE capability negotiation procedure proposed in the present specification.

FIG. 18 illustrates another example of a method for exchanging the FDR related capability information proposed in the present specification.

FIG. 19 illustrates an example of a method for exchanging the FDR related capability information between D2D UEs proposed in the present specification.

FIG. 20 is a flowchart illustrating an example of the FDR operation method proposed in the present specification.

FIG. 21 illustrates an example of the FDR operation in the FDR preparation mode in the FDR scenario proposed in the present specification.

FIG. 22 illustrates another example of the FDR operation in the FDR preparation mode in the FDR scenario proposed in the present specification.

FIG. 23 is a flowchart illustrating another example of the FDR operation method proposed in the present specification.

FIG. 24 is a flowchart illustrating another example of the FDR operation method proposed in the present specification.

FIG. 25 illustrates an example of inner block diagram of a BS and a UE proposed in the present specification.

BEST MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB (Macro eNB or Master eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2a is a diagram illustrating a radio protocol architecture for a user plane. FIG. 2b is a diagram illustrating a radio protocol architecture for a control plane. The user plane is a protocol stack for user data transmission. The control plane is a protocol stack for control signal transmission.

Referring to FIGS. 2a and 2b, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

FIG. 3 illustrates a radio frame structure defined in the 3GPP LTE/LTE-A system to which the present invention can be applied.

In the cellular OFDM wireless packet communication system, transmission of uplink/downlink data packets is carried out in units of subframes, and one subframe is defined as a predetermined time period including a plurality of OFDM symbols. The 3GPP LTE/LTE-A standard supports a type 1 radio frame structure that can be applied to frequency division duplex (FDD) scheme and a type 2 radio frame structure that can be applied to time division duplex (TDD) scheme. In the FDD mode, uplink transmission and downlink transmission are carried out separately in the respective frequency bands. On the other hand, for the TDD mode, uplink and downlink transmission are carried out separately in the time domain but occupy the same frequency band. Channel responses in the TDD mode are in fact reciprocal. This implies that a downlink channel response is virtually the same as the corresponding uplink channel response in the frequency domain. Therefore, it can be regarded as an advantage for a wireless communication system operating in the TDD mode that a downlink channel response can be obtained from an uplink channel response. Since the whole frequency domain is so utilized in the TDD mode that uplink and downlink transmission are performed in time division fashion, downlink transmission by an eNB and uplink transmission by a UE cannot be performed simultaneously. In a TDD system where uplink and downlink transmission are managed in units of subframes, uplink and downlink transmission are carried out separately in the respective subframes.

FIG. 3(a) illustrates a structure of a type 1 radio frame. A downlink radio frame consists of 10 subframes, and each subframe consists of two slots in the time domain. The time period needed to transmit one subframe is called a Transmission Time Interval (TTI). For example, length of each subframe can amount to 1 ms, and length of each slot can be 0.5 ms. Each slot includes a plurality of orthogonal frequency division multiplexing (OFDM) symbols in the time domain, and includes a plurality of resource blocks (RBs) in the frequency domain. The 3GPP LTE/LTE-A system uses the OFDMA method for downlink transmission; therefore, the OFDM symbol is intended to represent one symbol period. One OFDM symbol may be regarded to correspond to one SC-FDMA symbol or a symbol period. The resource block as a unit for allocating resources includes a plurality of consecutive subcarriers within one slot.

The number of OFDM symbols included within one slot can be varied according to the configuration of a cyclic prefix. The CP has an extended CP and a normal CP. For example, in case the OFDM symbol consists of normal CPs, the number of OFDM symbols included within one slot can be 7. In case the OFDM symbol consists of extended CPs, the number of OFDM symbols included within one slot becomes smaller than that for the normal CP case since the length of a single OFDM is increased. In the case of extended CP, for example, the number of OFDM symbols included within one slot can be 6. In case a channel condition is unstable as observed when the UE moves with a high speed, the extended CP can be used to further reduce inter-symbol interference.

Since each slot consists of 7 OFDM symbols when a normal CP is used, one subframe includes 14 OFDM symbols. At this time, the first maximum 3 OFDM symbols of each subframe are allocated to the physical downlink control channel (PDCCH) and the remaining OFDM symbols are allocated to the physical downlink shared channel (PDSCH).

FIG. 3(b) illustrates a type 2 radio frame. The type 2 radio frame consists of two half frames and each half frame consists of 5 subframes, and each subframe consists of two slots. Among the 5 subframes, a special subframe consists of a downlink pilot time slot (DwPTS), a guard period (GP), and an uplink pilot time slot (UpPTS). The DwPTS is used for the UE to carry out the initial cell search, synchronization and channel estimation. The UpPTS is used for the eNB to carry out channel estimation and uplink transmission synchronization with the UE. The GP is a period intended for removing interference generated during uplink transmission due to multi-path delay of a downlink signal between uplink and downlink transmission.

The structure of a radio frame described above is just an example, and the number of subframes included within one radio frame, the number of slots included within one subframe, and the number of symbols included within one slot can be varied in many ways.

FIG. 4 illustrates a resource grid with respect to one downlink slot in a wireless communication system to which the present invention can be applied.

With reference to FIG. 4, one downlink slot includes a plurality of OFDM symbols in the time domain. Each downlink slot includes 7 OFDM symbols, and each resource block includes 12 subcarriers in the frequency domain. However, the present invention is not limited to the illustrative configuration.

Each element of resource grids is called a resource element, and a resource block includes 12×7 resource elements. Each resource element in the resource grids can be identified by an index pair (k, l) within a slot. Here, k (k=0, . . . , NRB×12−1) stands for a subcarrier index in the frequency domain while l (l=0, . . . , 6) an OFDM symbol index in the time domain. The number NRB of resource blocks included in a downlink slot is dependent on downlink transmission bandwidth. The structure of an uplink slot can be the same as that of the downlink slot.

FIG. 5 illustrates a structure of a downlink subframe in a wireless communication system to which the present invention can be applied.

With reference to FIG. 5, in the first slot within a subframe, the first maximum three OFDM symbols make up a control region to which control channels are allocated, and the remaining OFDM symbols form a data region to which a PDSCH is allocated. The 3GPP LTE/LTE-A standard defines PCFICH, PDCCH, and PHICH as downlink control channels.

The PCFICH is transmitted from the first OFDM symbol of a subframe and carries information about the number (namely, size of the control region) of OFDM symbols used for transmission of control channels within a subframe. The PHICH is a response channel with respect to an uplink and carries a ACK/NACK signal with respect to HARQ. The control information transmitted through the PDCCH is called downlink control information (DCI). The DCI includes uplink resource allocation information, downlink resource allocation information, or uplink transmission (Tx) power control commands for an arbitrary UE group.

An eNB determines the PDCCH format according to Downlink Control Information (DCI) to be sent to a UE and adds a Cyclic Redundancy Check (CRC) to the control information. The CRC is masked with a unique identifier depending on an owner of the PDCCH or intended use of the PDCCH, which is called a Radio Network Temporary Identifier (RNTI). In the case of a PDCCH intended for a particular UE, a unique identifier for the UE, for example, Cell-RNTI (C-RNTI) can be masked with the CRC. Similarly, the CRC can be masked with a paging identifier, for example, Paging-RNTI (P-RNTI) in the case of a PDCCH intended for a paging message. The CRC can be masked with a system information identifier, for example, System Information-RNTI (SI-RNTI) in the case of a PDCCH intended for system information block. The CRC can be masked with a Random Access-RNTI (RA-RNTI) to designate a random access response in response to transmission of a random access preamble of the UE.

FIG. 6 illustrates a structure of an uplink subframe in a wireless communication system to which the present invention can be applied.

With reference to FIG. 6, an uplink subframe is divided into a control region and a data region in the frequency domain. A PUCCH which carries uplink control information is allocated to the control region. A PUSCH which carries data is allocated to the data region. If an upper layer commands, the UE can support the PUSCH and the PUCCH at the same time. A resource block pair is allocated within a subframe for the PUCCH of each UE. The resource blocks belonging to a resource block pair allocated to the PUCCH occupy different subcarriers at each of two slots based on a slot boundary. In this case, the resource block pair allocated to the PUCCH is said to perform frequency hopping at slot boundaries.

Next, system information will be disclosed.

The system information includes essential information that needs to be known to a UE to access a BS. Thus, the UE has to receive all system information before accessing the BS. Further, the UE always has to have the latest system information Since the system information is information that must be known to all UEs in one cell, the BS periodically transmits the system information.

According to the section 5.2.2 of 3GPP TS 36.331 V8.7.0 (2009-09) 'Radio Resource Control (RRC); Protocol specification (Release 8)', the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

FIG. 7 is a flowchart showing an RRC connection establishment procedure to which the present invention can be applied.

A UE sends to a network an RRC connection request message for requesting an RRC connection (step S710). The network sends an RRC connection setup message in response to the RRC connection request (step S720). After receiving the RRC connection setup message, the UE enters an RRC connection mode.

The UE sends to the network an RRC connection setup complete message used to confirm successful completion of the RRC connection establishment (step S730).

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.)

FIG. 8 is a flowchart showing a method of performing measurement to which the present invention can be applied.

A UE receives measurement configuration information from a BS (step S810). A message including the measurement configuration information is referred to as a measurement configuration message. The UE performs measurement based on the measurement configuration information (step S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) 'Evolved Universal Terrestrial Radio Access (E-UTRA) Radio Resource Control (RRC); Protocol specification (Release 8)'.)

UE Capability Negotiation

FIG. 9 is a flowchart illustrating an example of the UE capability negotiation procedure.

A BS requires the UE capability information for managing radio resource. In addition, in order for a network to manage (e.g., mobility support, etc.) a UE, the UE capability information is required.

The UE capability information includes various types of information for managing/operating the radio resource for the UE. As an example, the UE capability information may include the information related to power control, the code resource information, the information related to encryption, and so on.

Referring to FIG. 9, after the RRC connection is established, the BS (EUTRAN) transmits a UE capability enquiry message to the UE (step, S910), and the UE transmits the UE capability information to the BS in response to the UE capability enquiry message (step, S920).

FDR System

FIG. 10 is a conceptual diagram illustrating an example of the Full-Duplex Radio system.

The Full-Duplex Radio (FDR) system (hereinafter, referred to as 'FDR system') is referred to as a system for supporting a wireless device (UE or BS) to perform transmission and reception simultaneously using an identical radio resource (identical time/frequency/space, etc.).

The wireless device in the FDR system is referred to as 'FDR wireless device'. And the FDR wireless device may perform transmission and reception operation simultaneously through an identical radio resource. Such an operation of the FDR wireless device is expressed as the FDR operation.

The FDR wireless device performs the FDR operation in the Full-Duplex (FD(R)) mode.

That is, in the FD mode, the FDR wireless device performs transmission and reception operation simultaneously through an identical radio resource.

As shown in FIG. 10, an eNB or a UE may perform the FDR operation, or the eNB and the UE may simultaneously perform the FDR operation.

However, since the FDR wireless device performs transmission and reception operation simultaneously using an identical radio resource in the FDR system, the interference such as intra-device interference or inter-device interference occurs.

The intra-device interference means the interference that is occurred from a signal being received by the reception antenna of the corresponding eNB or UE, which is transmitted from the transmission antenna which is equipped in an eNB or a UE, and may also be referred to as self interference.

The inter-device interference (IDI, hereinafter, referred to as 'IDI') is referred to as the interference that is occurred while the (uplink) radio signal transmitted from an eNB or a UE is received by the adjacent (or neighboring) BS or UE, and may also be expressed as co-channel interference.

Inter-device Interference (IDI)

FIG. 11 is a conceptual diagram illustrating an example of the IDI occurred in the FDR system. FIG. 11a shows the IDI which is occurred in the case that there are two UEs. And FIG. 11b shows the IDI which is occurred in the case that there are four UEs.

In the case of FIG. 11a, while a BS performs the FDR operation, the IDI occurs in UE 1 due to the transmission signal from UE 2.

That is, in the case that the BS performs a reception from UE 2 and a transmission to UE 1 using an identical resource, when the UE 1 receives signals from the BS, the IDI occurs in the UE 1 due to the transmission signal from the UE 2 to the BS.

FIG. 11b shows the case that the BS performs the FDR operation, and UEs 1 to 4 perform the multiple access of FDMA or TDMA.

As shown in FIG. 11b, the IDI occurs in UE 4 due to the transmission signal from UE 3, and the IDI occurs in UE 1 due to the transmission signal from UE 2.

In the case of using the frequency division duplex (FDD) or the time division duplex (TDD) in the FDR system, the IDI mentioned above does not occur since different radio resources are used in the transmission and reception operations.

And, in the FDR system, the Full-Duplex that does not use an identical radio resource as well as the Full-Duplex that uses an identical radio resource may be existed.

UE Grouping Method for the FDR Operation

Hereinafter, as a method for mitigating the IDI in the FDR system, the IDI measurement and the IDI measurement result reporting, and a method for UE grouping for the FDR operation (hereinafter, referred to as 'FDR grouping') will be described in detail.

The UE grouping is referred to as a process of grouping UEs in a group positioned in a cell based on a specific standard. The specific standard may be the interference signal strength of the neighboring UEs in a cell, the geometric deployment of the UEs in a cell, and so on.

FIG. 12 is a flowchart illustrating an example of the UE grouping method.

First, a BS transmits the information for grouping to candidate UEs that are going to be set as a group (step, S1210).

Later, the candidate UEs that are going to be grouped measure the IDI from the neighboring UEs (step, S1220).

The detailed procedure for the UEs to measure the IDI and to report the IDI measurement result is as follows.

That is, the BS (or network) assigns a signature that is specific to a UE or a UE group in order to decrease or remove the IDI measured in the UE.

Herein, the signature means a signal that distinguishes between UEs or distinguishes between UE groups for the IDI measurement. In the case of assigning a specific signature to each UE group, it is preferable that the UE group is already formed.

The type of the signature signal may be code sequence, puncturing pattern, and the like, and any type is available if it may distinguish UEs or UE groups.

In the case of using the code sequence as the signature signal, the scramble or interleaving that is specific to the UE or UE group may be applied.

In addition, in order to easily perform the IDI measurement in the UE that receives the signature signal, the signature signal may be exclusively transmitted or allocated to a single UE or a single UE group. Herein, the basic unit of exclusive transmission or allocation may be an OFDM symbol.

As an embodiment, in the case of using the code sequence for the configuration of the signature signal and in the case that a UE transmits the signature signal using an OFDM symbol, the index of sequence that each UE is going to transmit may be calculated through a UE ID.

That is, the index of sequence that each UE is going to transmit may be expressed as a function (UE_ID).

Otherwise, in the case that the amount of information that constructs the UE ID is greater than the index of code sequence, the index of sequence that each UE is going to transmit may be calculated through the modular operation, that is, Equation 1 below.

$$\text{Sequence Index} = (\text{UE ID}) \bmod (\text{Total index number}) \quad \text{[Equation 1]}$$

As another embodiment, in order to distinguish each of signature signals, the signature signal may be constructed by m-sequence by reflecting the UE_ID or the sequence index.

That is, the m-sequence of the Equation below that is used in the Secondary Synchronization Signal of LTE may be used.

$$m_0 = m' \bmod 31$$
$$m1 = (m0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor, q' = \lfloor N_{ID}^{(1)}/30 \rfloor$$

Herein, since m' may be obtained by using the UE_ID or the sequence index, $N_{ID}^{(1)}$ may distinguish each of the signature signals.

Through the signature transmitted from a BS, a UE may know the signal strength for the UE that causes the IDI, the UE or signature index, the channel vector such as phase, the timing information, and so on.

Later, the UEs report the IDI measurement result to the BS (step, S1230).

Then, the BS performs the FDR grouping based on the reported IDI measurement result (step, S1240).

When the FDR grouping procedure is completed, the BS transmits the information related to the FDR group that is configured through the FDR grouping procedure to the UEs (step, S1250).

Later, the UEs repeatedly perform the IDI measurement and the IDI measurement result report until the FDR grouping procedure is completed. That is, the UEs periodically measure the IDI, and perform the operation of reporting the IDI measurement result to the BS (step, S1260).

Hereinafter, a method for exchanging the FDR related capability information in the FDR system, a detailed procedure definition for the FDR operation, an operation mode related to the FDR operation, etc. will be described in detail.

Method for Exchanging FDR Related Capability Information

First, in order to perform the FDR grouping efficiently, a method for exchanging the FDR related capability information between UEs, between a UE and a BS, and between BSs, that is, a method for the FDR capability negotiation procedure will be described.

Firstly, the FDR scenario proposed in the present specification may includes the three cases below largely according to the network environment (or structure) or the subject of performing FDR operation:

FDR scenario 1. FDR operation method in the Infrastructure network

FDR scenario 2. FDR operation method in the Infrastructure network & D2D network FDR scenario 3. FDR operation method in the D2D network The detailed description for each of the FDR scenarios will be described in detail by reference to FIGS. 13 to 15.

In addition, the following terminology will be used in the FDR scenarios proposed in the present specification.

1. FD(R) Host
2. FD(R) member
3. FD(R) capability device

First, the FDR Host means a UE or a BS that performs the FDR operation, that is, a UE or a BS operated in the FD activation mode.

The FD activation mode is a mode for performing the FDR operation, and referred to as the mode for an FDR UE or a BS to perform a transmission and reception simultaneously using an identical radio resource (time, frequency, space, etc.).

Next, the FDR member means a BS or a UE that plays the role of assisting the FDR Host.

In case of corresponding to the FDR member, a BS or a UE performs the operation of measuring the IDI and reporting the IDI measurement result to the BS or the FDR Host.

Next, the FDR capability device is referred to as a UE or a BS that has the capability of performing the FDR operation. All of the FDR Host and the FDR member correspond to the FDR capability device.

By reference to FIGS. 13 to 15, the FDR scenarios proposed in the present specification will be described.

FIG. 13 is a conceptual diagram illustrating an example of the FDR scenario proposed in the present specification.

That is, FIG. 13 illustrates the FDR scenario that a BS is operated as an FDR Host in the infrastructure network.

Here, the BS is an FDR Host, and UE 1 corresponds to an FDR member.

The BS that corresponds to an FDR Host performs the operation of receiving from UE 2 and transmitting to UE 1 simultaneously through an identical resource. In this case, the transmission signal of UE 2 generates the IDI in the reception of UE 1.

In this case, the UE 1 that corresponds to an FDR member measures the IDI occurred from the UE 2, and reports the IDI measurement result to the BS. Here, the BS and the UE 1 are the FDR capability devices.

FIG. 14 illustrates another example of the FDR scenario proposed in the present specification.

That is, FIG. 14 shows the scenario that a UE operates as an FDR Host in the radio environment in which the infrastructure network and the D2D network are mixed.

FIG. 14a shows the FDR operation that the UE corresponding to an FDR Host transmits to a BS and receives from another UE, and FIG. 14b shows the FDR operation that the UE corresponding to an FDR Host receives from a BS and transmits to another UE.

Since only the transmission/reception direction performed by the UE which is an FDR Host is different, FIG. 14 will be mainly described.

As shown in FIG. 14a, UE 1 is an FDR Host, and the BS is an FDR member. Accordingly, the BS measures the IDI occurred from UE 2.

Since the BS is the subject to perform the FDR grouping using the IDI measurement result, the BS is not required to separately report the IDI measurement result. However, the BS may report the IDI measurement result to UE 1.

FIG. 15 illustrates another example of the FDR scenario proposed in the present specification.

That is, FIG. 15 shows the scenario that a UE operates as an FDR Host in the D2D network.

Here, UE 3 is an FDR Host, and UE 2 operates as an FDR member.

Accordingly, UE 2 measures the IDI occurred due to UE 1, and reports the IDI measurement result to a BS or UE 3.

Preferably, UE 2 reports the IDI measurement result to the BS.

However, in the case that the D2D communication is performed between UEs without involvement of the BS (e.g., WiFi direct, etc.), it is preferable that UE 2 reports the IDI measurement result to UE 3 which is the FDR Host.

FIG. 16 illustrates an example of a method for exchanging the FDR related capability information through an initial access procedure proposed in the present specification.

Referring to FIG. 16, an eNB transmits its own FDR related capability information to a UE (step, S1610).

Here, the FDR related capability information is the information representing whether to have the capability of performing the FDR operation, which is to perform a transmission and reception simultaneously using the identical resource.

The FDR related capability information of the eNB that the eNB transmits may be periodically transmitted through the system information.

Preferably, the FDR related capability information may be transmitted through RadioResourceConfigCommonSIB of System Information Block 2 (SIB 2).

Later, the UE transmits its own FDR related capability information to the eNB.

Here, the FDR related capability information of the UE may be transmitted to the eNB after an initial access or during the initial access procedure. Hereinafter, the method for the FDR related capability information to be transmitted during the initial access procedure will be described, and the method for the FDR related capability information to be transmitted after the initial access procedure will be described in FIG. 17.

In the case that the FDR related capability information of the UE is transmitted during the initial access procedure, the FDR related capability information may be transmitted through the RRC connection establishment procedure that corresponds to steps, S1620 to S1640.

That is, the UE may transmit the FDR related capability information of the UE together in step, S1620 or S1640, that is the step of transmitting the RRC related message to the eNB, or transmit the FDR related capability information through an additional message between steps, S1620 and S1640.

In the case that the UE transmits the FDR related capability information during the initial access procedure, the indication information of 1 bit that represents whether the UE has the capability of performing the FDR operation may be included in the corresponding message.

The corresponding message is the RRC connection Request message or the RRC connection Setup Complete message.

Later, the UE transmits the UE capability Enquiry message to the eNB (step, S1650), and receives the UE capability information in response to the UE capability Enquiry message from the eNB (step, S1660).

The FDR related capability information (FDR related parameter) may include the FD mode (support) indication information that represents whether to support the FD mode that may be operated as the FDR Host, the FD assist indication information that represents whether to support the FDR assist as an FD member, and so on.

The FD mode indication information means the information that represents whether an eNB or a UE is available to operate as an FDR Host, and may be expressed as 1 bit.

The FD assist indication information is the parameter that represents whether to participate in the FDR grouping and to operate as an FDR member, and may be expressed as 1 bit.

In the case that the FD mode indication information indicates to support the FD mode, the FDR related capability information further includes a parameter that represents the operation method of the FD mode.

The parameter that represents the operation method of the FD mode is the information that represents whether the operation method of the FD mode is performed through the grouping or other method. In the case that the operation method of the FD mode is performed through the grouping, the parameter may further include the following information related to the FDR grouping method.

(1) geometric grouping, (2) worst IDI grouping, (3) best IDI grouping, (4) grouping using the frequency information used for the FDR Here, in the case of an eNB or a D2D communication, the FDR grouping may be performed by a UE that is operated as the FDR Host.

The geometric grouping represents that the FDR grouping method is performed by considering the geometric information of a UE, and the like.

The worst IDI grouping represents that the FDR grouping method is performed among the UEs that report the values greater than a specific value (a threshold value, predetermined value) as a result of the IDI measurement, that is, great IDI values.

On the contrary, the best IDI grouping represents that FDR grouping method is performed among the UEs that report the values smaller than a specific value as a result of the IDI measurement, that is, small IDI values.

The grouping that uses the frequency information used for the FDR operation represents that the FDR grouping method is performed among the UEs that use the same frequency or among the UEs that use different frequencies.

Later, in the case that the FDR capability negotiation procedure is completed, the UE may enter the Non FDR mode (step, S1670). The Non FDR mode is the mode that the FDR capable UE waits for being switched to the FD mode.

FIG. 17 illustrates an example of a method for exchanging the FDR related capability information through the UE capability negotiation procedure proposed in the present specification.

Since the steps, S1710 to S1740 are the same as the steps, S1610 to S1640, the detailed description is omitted, and only the different parts will be described.

As shown in FIG. 17, after an initial access procedure, a UE may transmit the FDR related capability information using the UE capability negotiation procedure of steps, S1750 to S1760. That is, the UE transmits its own FDR related capability information to an eNB together with the UE capability information of step, S1760.

Here, the eNB may transmit its own FDR related capability information through the system information, but may also transmit the FDR related capability information when transmitting the UE capability Enquiry message of step, S1750 together.

In the case that the FDR related capability information is transmitted through the UE capability information, the FDR related capability information may be transmitted using one of the physical parameters of the UE capability information.

FIG. 18 illustrates another example of a method for exchanging the FDR related capability information proposed in the present specification.

Before defining the FDR operation in the FDR system, in the case that an FDR capable FDR eNB is firstly deployed in the FDR system, FIG. 18 shows a method for the eNB to exchange the FDR related capability information with each other during the capability negotiation procedure with an adjacent (or neighboring) eNB or an MME.

Here, the FDR related capability information of the eNB may be transmitted through the X2 interface or the S1 interface.

The FDR related capability information of each eNB may be directly exchanged using the X2 interface (step, S1810).

In addition, in the case that the FDR related capability information is exchanged using the S1 interface, the FDR related capability information between the MME and the eNB is exchanged, and the eNB may acquire the FDR related capability information of the adjacent (or neighboring) eNB through the MME (step, S1820).

The FDR related capability information may include the FD mode (support) indication information, the FD assist indication information, the parameter that represents the operation mode of the FD mode, the information related to the FD grouping method, and so on, described above.

FIG. 19 illustrates an example of a method for exchanging the FDR related capability information between D2D UEs proposed in the present specification.

Before defining the FDR operation in the D2D network, in the case that an FDR capable D2D UE is firstly entered in the D2D network, FIG. 19 shows a method for the D2D UE to exchange the FDR related capability information with each other when directly performing the D2D communication with a neighboring UE.

As shown in FIG. 19, the exchange of the FDR related capability information between D2D UEs may be performed in a device discovery step during the D2D communication procedure (step, S1910). That is, UE 1 and UE 2 transmit the messages to be exchanged in the device discovery step with its own FDR related capability information being included mutually.

As another example, after it is determined to perform the D2D communication, that is, after the D2D connection establishment between D2D UEs is completed (step, S1910'), each of the D2D UEs may exchange the FDR related capability information with each other (step, S1920').

In this case, the FDR related capability information of each D2D UE may be exchanged through an additional message or through the message transmitted when an event occurs, and so on.

In the case that it is identified that the D2D UEs are FDR capable through the exchange of the FDR related capability information, one of the D2D UEs performs the role of the FDR Host, and another UE performs the role of an FDR member that assists the FDR Host.

Similarly, the FDR related capability information may include the FD mode indication information, the FD assist indication information, the parameter that represents the operation mode of the FD mode, the information related to the FD grouping method, and so on.

Mode Definition Related to FDR Operation

Hereinafter, the modes in relation to the FDR operation will be described.

In the FDR scenario proposed in the present specification, an FDR UE or a BS may have three types of modes, that is, (1) Non-FDR mode (FDR deactivation mode), (2) FDR preparation mode, (3) FDR mode (FDR activation/member mode).

Particularly, the FD host and the FD member perform the FDR operation using the three types of modes in the FDR scenario.

First, the FD(R) mode is referred to as the mode for an FDR capable UE or a BS to perform the FDR operation as described above. Here, the FDR operation means the operation of performing a transmission and reception simultaneously using an identical resource.

In the case that the FDR host is in the FDR mode, which may be expressed by the FDR activation mode. In the case that the FDR member is in the FDR mode, which may be expressed by the FDR member mode.

Next, the Non-FDR mode is the FDR deactivation mode, and referred to as the mode in which the FDR operation is still not activated.

That is, the FDR capable UE or the BS in the Non-FDR mode may wait for being switched to the FDR mode.

Next, the FDR preparation mode is the mode for the FDR capable UE or the BS to operate when performing the IDI measurement/measurement report and the FDR grouping method.

The FDR preparation mode has different meanings whether the FD member is in the FDR preparation mode or the FD host is in the FDR preparation mode.

That is, the FDR preparation mode for the FDR member means the mode of the state in relation to the procedure that the UE (FDR member UE) corresponding to the FDR member before being switched to the FDR member mode measures the IDI of the neighboring UE.

In this case, the FDR member UE enters the FDR preparation mode after receiving an IDI measurement configuration message for the FDR grouping from the BS. When the FDR member UE is included in a specific FDR group or completes the IDI measurement, the FDR preparation mode is ended.

In addition, the FDR preparation mode for the FDR host is referred to as the state that the UE (FDR host UE) corresponding to the FDR host waits for receiving the FD group information from the BS before being switched to the FDR mode or the FDR activation mode.

The FDR host enters the FDR preparation mode at the time of transmitting an FD grouping request message or receiving an FD grouping response message. When an FD grouping timer is terminated or the FDR host receives the FD group information from the BS, the FDR preparation mode is ended.

Here, the FD grouping timer is the timer related to the FD group information reception, and it is driven on the time of receiving the FD grouping response message from the BS and ended on the time of receiving the FD group information from the BS.

The reason why driving the FD grouping timer is to prevent the FDR host from retransmitting the FD grouping request message to the BS unnecessarily.

That is, since the BS should perform the procedures such as the IDI measurement, the IDI measurement result collection, the FD grouping, and so on after transmitting the FD grouping response message, it may take a lot of time till transmitting the FD group information to the FD host.

Accordingly, by driving the FD grouping timer, even though the FDR host is unable to receive the FD group information while the FD grouping timer is driven, the FDR host may not retransmit the FD grouping request message to the BS.

In addition, it may be implemented that the FD grouping timer is driven when the FD grouping request message is transmitted to the BS, and terminated when t the FD group confirm message is transmitted to the BS.

The FD grouping timer is distinguished from the RRC message related timer which is driven on the time of the FD grouping request message being transmitted and terminated on the time of the FD grouping response message being received.

The RRC message related timer is terminated when receiving the FD grouping response message. In the case that the FD grouping timer is driven on the time of the FD grouping response message being transmitted, that is, in the case that the FD grouping timer is driven with the RRC message related timer, and in the case of being unable to receive the FD grouping response message until the RRC message related timer is terminated, the FD grouping timer is terminated on the time of the RRC message related timer being terminated.

Detailed Definition of FDR Operation Procedure for FDR Grouping

Hereinafter, after exchanging the FDR related capability information, a detailed FDR operation procedure for efficient FDR grouping will be described.

FIG. 20 is a flowchart illustrating an example of the FDR operation method proposed in the present specification.

The FDR related capability information is exchanged between a UE and a BS, between UEs or between BSs (step, S2010).

The detailed description for a method for exchanging the FDR related capability information will refer to FIGS. 16 to 19.

Here, it is assumed that the FDR host and the FDR member that are going to perform the FDR operation are predetermined. However, the FDR host and the FDR member may be determined after step, S2010 by the BS or by the request of the UE.

Later, each of the FDR host and the FDR member enters the FDR preparation mode (step, S2020). Here, the FDR member enters the FDR preparation mode after receiving the IDI measurement configuration information from the BS.

The FDR member measures the IDI in the FDR preparation mode, and transmits the IDI measurement result to the BS (steps, S2030 and S2040).

Here, the BS is not required to transmit the IDI measurement result separately in the case that the BS is an FDR member, but may transmit the IDI measurement result to the FDR host if it is needed.

In addition, the FDR host enters the FDR preparation mode and transmits the FD grouping request message to the BS, and receives the FD grouping response message in response to the FD grouping request message (step, S2050).

In the case of receiving the FD grouping response message, the FDR host drives the FD grouping timer, and waits for receiving the FD group information from the BS until the FD grouping timer is terminated.

In the case that the FDR host is unable to receive the FD group information until the FD grouping timer is terminated, the FDR host retransmits the FD grouping request message to the BS.

Later, the BS performs the FDR grouping based on the IDI measurement result report that is received from the FDR member (step, S2060). The detailed description for the FDR grouping will refer to FIG. 12.

Then, the BS transmits an FDR mode transition command message that instructs each of the FDR capable UEs to be grouped into a (specific) FDR group (step, S2070).

The FDR mode transition command message may include the information related to the FDR group such as the signature information that corresponds to the FDR group.

The UE that receives the FDR mode transition command message is switched to the FD mode.

That is, the FDR host is operated in the FDR activation mode, and the FDR member is operated in the FDR member mode.

Here, in the case that the BS is operated in the FD mode as the FDR host, the BS may perform the Flexible TDD mode or the Full Duplex mode, and in the case that the UE is operated in the FD mode as the FDR host, the UE may perform only the Full Duplex mode.

Hereinafter, the FDR preparation mode in the case that a UE is an FDR member or the UE is an FDR host in the FDR scenario will be described in more detail by reference to FIGS. 21 and 22.

FIG. 21 illustrates an example of the FDR operation in the FDR preparation mode in the FDR scenario proposed in the present specification.

As shown in FIG. 21, an FDR capable UE exchanges the FDR related capability information with an eNB or a network in an initial network access procedure (step, S2110). Here, it is assumed that the FDR capable UE is an FDR member.

The FDR member UE is in the Non FDR mode, and waits for switching to the FD mode.

In addition, it is preferable that the FD models the mode that is valid for the UE in a connected state, but may also be valid for the UE in an idle state.

Later, the FDR member UE receives the IDI measurement configuration (neighbor UE interference measurement configuration) information (or message) for the FDR grouping from the eNB (step, S2120). In step, S2120, the FDR member UE enters the FDR preparation mode (step, S2130).

The IDI measurement configuration information may include the list information of the neighboring UE to measure the IDI and the information related to the measurement result reporting method.

The list information of the neighboring UE to measure the IDI may include the signature information that represents the UE or the UE group.

The information related to the measurement result reporting method may include the event-triggered reporting method or the periodic reporting method.

The event-triggered reporting method uses a threshold value, and the threshold value may be configured in a cell-specific manner or a UE group-specific manner.

The periodic reporting method is a method for reporting periodically, and may use the offset information, and so on.

Later, the FDR member UE measures the IDI based in the IDI measurement configuration information received from the eNB (step, S2140), and reports the IDI measurement result to the eNB (step, S2150).

That is, in the case that the measurement reporting condition indicated by the eNB is satisfied, the FDR member UE reports the IDI measurement result to the eNB.

Until receiving a specific instruction from the eNB, the FDR member UE performs the IDI measurement and the IDI measurement result reporting repeatedly.

In the case that the FDR capable UE receives the IDI measurement configuration information from the eNB but does not want to operate as an FDR member considering the situation of UE, etc., the FDR capable UE may not report the IDI measurement result to the eNB.

In this case, the FDR capable UE does not enter the FDR preparation mode, but maintains the Non FDR mode.

In addition, the FDR capable UE transmits an FD reject message to the eNB, and accordingly, explicitly notifies not to participate in the FDR grouping as an FDR member.

As described above, the FDR member UE enters the FDR preparation mode on the time of receiving the IDI measurement configuration message for the FDR grouping from the eNB. And the FDR preparation mode may be ended when the FDR member UE is included in a specific FDR group or the IDI measurement is completed, or receiving an ED mode transition related message from the eNB (step, S2160).

Later, the FDR member UE measures the IDI with the shorter period than the previous IDI measurement period for the UEs within the FDR group in the FDR member mode, and reports the IDI measurement result. The FDR member UE measures the IDI with the longer period than the previous IDI measurement period for the UEs outside of the FDR group, and reports the IDI measurement result.

FIG. 22 illustrates another example of the FDR operation in the FDR preparation mode in the FDR scenario proposed in the present specification.

As shown in FIG. 22, an FDR capable UE (or node) exchanges the FDR related capability information with an eNB or a network in an initial network access procedure (step, S2210).

Here, it is assumed that the FDR capable UE is the FDR host.

Later, the FDR host UE transmits the FD grouping request message for requesting the FDR grouping configuration to the eNB (step, S2220). The FD grouping request message may also be transmitted by the eNB. Here, the FDR host UE may drive the RRC related timer on the time of the FD grouping request message being transmitted.

The FD grouping request message may include the information of neighboring UE that the FDR host UE wants to communicate with.

That is, the FD grouping request message may include candidate FDR communication UE list information. The candidate FDR communication UE list information may include UE IDs or UE signature information.

Later, the FDR host UE receives the FD grouping response message in response to the FDR grouping request message from the eNB (step, S2230).

The eNB performs the FDR grouping in order to provide the efficient FDR operation of the UE based on the received ED grouping request message (step, S2240).

When receiving the FD grouping request message, the FDR host UE drives the FD grouping timer (step, S2250).

And, the FDR host UE waits for receiving the FD group information from the eNB until the FD grouping timer is terminated.

In the case that the FDR host UE is unable to receive the FD group information until the FD grouping timer is terminated, the FDR host UE requests the FD grouping request message to the eNB again.

Later, the FDR host UE receives the FD group information from the eNB (step, S2260), and transmits the FD group confirm message in response to the FD group information to the eNB (step, S2270).

The FD group information may include the UE ID list representing the UEs that are going to be included in the FDR group, the signature information or frequency information representing UE or UE group, and so on.

Later, the FDR host UE is switched to the FD mode, and performs a transmission and reception simultaneously using the same resource with the eNB or other UEs (step, S2280).

FIG. 23 is a flowchart illustrating another example of the FDR operation method proposed in the present specification.

Here, the FDR host is an eNB and the FDR member is UE 1.

In the case of FIG. 23, the eNB and the UE exchange the FDR related capability information through the UE capability negotiation procedure after an initial access procedure (after the RRC connection establishment procedure is completed).

Referring to FIG. 23, the UE performs the RRC connection establishment procedure with the eNB (step, S2310). The RRC connection establishment procedure may be expressed as a UE connection establishment procedure. The detailed description for the RRC connection establishment procedure will refer to FIG. 7.

Later, the UE and the eNB exchange the FDR related capability information with each other through the UE capability negotiation procedure (step, S2320). That is, the UE transmits the UE capability Enquiry message that includes its own FDR related capability information to the eNB.

Then, the eNB transmits the UE capability information that includes its own FDR related capability information to the UE.

Through step, S2320, the UE and the eNB expect to perform the FDR operation by identifying whether the counterpart has the FDR related capability.

After step, S2320, the UE is the Non FDR mode, and may wait for switching to the FD mode.

Later, the eNB transmits the IDI measurement configuration information for instructing the IDI measurement to the UE (step, S2330). When receiving the IDI measurement configuration information, the UE is switched to the FDR preparation mode (step, S2340), That is, the UE is switched to (or enters) the FDR preparation mode, and performs the procedure of the IDI measurement and the IDI measurement result reporting.

Accordingly, the UE measures the IDI with a neighboring UE based on the received IDI measurement configuration information (step, S2350), and reports the IDI measurement result to the eNB (step, S2360).

Later, the eNB performs the FDR grouping based on the IDI measurement result report received from the UE (step, S2370).

Then, when completing the FDR grouping, the eNB transmits the FDR mode transition command for notifying that the UEs are going to be included in the FDR group to the UEs (step, S2380). Here, the FDR mode transition command message may include the information related to the FDR grouping.

That is, the UE that receives the FDR mode transition command is switched to the FDR member mode. The UE in the FDR member mode measures the IDI with the shorter period than the previous IDI measurement period for the UEs within the FDR group in the FDR member mode and measures the IDI with the longer period than the previous IDI measurement period for the UEs outside of the FDR group, and reports the corresponding IDI measurement result to the eNB.

FIG. 24 is a flowchart illustrating another example of the FDR operation method proposed in the present specification.

FIG. 24 shows the case that a UE is operated as the FDR host in the FDR system in which the infrastructure network and the D2D network are mixed.

In FIG. 24, UE 1 is the FDR host, and an eNB and UE 2 are FDR members.

In the case of FIG. 24, the UE and the eNB exchange the FDR related capability information through the UE capability negotiation procedure after an initial access procedure, and the exchange of the FDR related capability information between UEs is performed during the D2D discovery/communication procedure.

Referring to FIG. 24, after UE 1 and the eNB perform the RRC connection establishment procedure (step, S2410), UE 1 and the eNB exchange the FDR related capability information of the counter part with each other through the UE capability negotiation procedure (step, S2420).

In addition, the eNB exchanges the FDR related capability information with UE 2 (step, S2430). Similarly, step, S2430 may be performed during the RRC connection establishment procedure or during the UE capability negotiation procedure.

And, UE 1 and UE 2 may exchange the FDR related capability information with each other during the D2D discovery procedure or the D2D communication procedure (step, S2440).

Later, UE 1 that corresponds to the FDR host exchanges the FD group request message and the FD group response message with the eNB (step, S2450).

Here, UE 1 enters the FDR preparation mode through step, S2450. In addition, UE 1 drives the FD grouping timer on the time of receiving the FD group response message from the eNB (step, S2460). The FD grouping timer may be configured to be driven during the FDR preparation mode.

That is, the FD grouping timer may be configured to be driven until UE 1 receives the FD group information from the eNB or transmits the FD group confirm message to the eNB.

Later, the eNB performs the FDR grouping based on the IDI measurement result. That is, the eNB transmits the IDI measurement configuration information to UE 2. UE 2 measures the IDI with a neighboring UE based on the received IDI measurement configuration information, and reports the IDI measurement result to the eNB (step, S2470).

When receiving the IDI measurement configuration information, UE 2 enters the FDR preparation mode.

The eNB forms an FDR group based on the received IDI measurement result reporting, and transmits the FD group information that includes the information related to the FDR group which is formed to UE 1 (step, S2480).

Later, UE 1 transmits the FD group confirm message to the eNB in response to the FD group information (step, S2490).

After step, S2490, UE 1 enters the FD mode, that is, the FDR activation mode, and UE 2 enters the FD mode, that is, the FDR member mode when receiving the FD mode transition command message.

Later, UE 1 performs a transmission and reception simultaneously using the same resource as the eNB and UE 2.

FIG. 25 illustrates an example of inner block diagram of a BS and a UE proposed in the present specification.

As shown in FIG. 25, an eNB 2510 and a UE 2520 include communication units (transmitting/receiving units, RF units 2513 and 2523), processors 2511 and 2521, and memories 2512 and 2522.

The eNB and the UE may further include input units and output units.

The communication units 2513 and 2523, the processors 2511 and 2521, the input units and output units, and the memories 2512 and 2522 are operatively connected with each other in order to perform the methods as proposed in the present specification.

The communication units (transmitting/receiving units or RF units 2513 and 2523) receive the information created from a PHY (Physical Layer) protocol, transfer the received information through RF (Radio Frequency) spectrums and conduct filtering and amplification, and then transmit the results through antennas. Further, the communication units transfer RF (Radio Frequency) signals received through the antennas to bands processable by the PHY protocol and perform filtering.

However, the communication units may also include the functions of switches to switch transmitting and receiving functions.

The processors 2511 and 2521 implement functions, procedures, and/or methods as proposed herein. The layers of radio interface protocols may be implemented by the processors.

The processors may be represented as control parts, controllers, control units, or computers.

The memories 2512 and 2522 are connected with the processors to store protocols or parameters for performing the FDR operation in the FDR system.

The processors 2511 and 2521 may include an application-specific integrated circuit (ASIC), a separate chipset, a logic circuit, and/or a data processing unit. The memory may include a read-only memory (ROM), a random access memory (RAM) a flash memory, a memory card, storage medium, and/or other equivalent storage devices. The communication unit may include a base-band circuit for processing a radio signal. When the embodiment of the present invention is implemented in software, the aforementioned methods can be implemented with a module (i.e., process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

The elements and the method described in the embodiments are not limitedly applied to the method for performing the FDR operation in the FDR system proposed in the present specification, but the whole or a part of each of the embodiments may be selectively constructed so as to form various modifications.

Meanwhile, the method as proposed herein may be implemented as processor-readable codes in a recording medium that may be read by a processor provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc. and may be further implemented in the form of carrier waves such as transmitted over the Internet. Further, the recording media readable by the processor may be distributed to computer systems connected with each other via a network, and processor readable codes may be stored and executed in a distributing manner.

In addition, so far the preferred embodiments are shown and described in the present specification, but the present invention is not limited to the described specific embodiments. And it is understood that various modifications are available to those skilled person in the art without departing from the theme of the present invention claimed in the claims, and the various modifications should not be independently understood from the inventive concept or the prospect of the present invention.

Furthermore, both of the device invention and the method invention are described in the present specification, and the description for the both invention may be applied complementarily.

INDUSTRIAL APPLICABILITY

The present specification relates to use the FDR operation in a wireless communication system that supports the Full Duplex Radio (FDR).

The invention claimed is:

1. A method for performing, by a user equipment (UE), a Full-Duplex (FD) Radio (FDR) operation in a wireless communication system, the method comprising:
    transmitting, to a base station (BS), FDR capability information that represents whether to have a capability of performing the FDR operation;
    receiving, from the BS, Inter-Device-Interference (IDI) measurement configuration information;
    determining whether or not to enter an FDR preparation mode;
    performing an IDI measurement based on the received IDI measurement configuration information when it is determined to enter the FDR preparation mode;
    reporting, to the BS, a result of the IDI measurement;
    receiving, from the BS, a control message notifying that the UE is included in a group related to the FDR operation; and
    transitioning from the FDR preparation mode to an FDR mode in response to the control message,
    wherein the FDR capability information includes indication information that represents whether to support an FDR mode for which transmission and reception operations are available to be performed simultaneously using an identical radio resource.

2. The method of claim 1, wherein the BS is an FDR host that performs the FDR operation in the FDR mode, and
    wherein the UE is an FDR member that assists the FDR host.

3. The method of claim 2, wherein the FDR capability information includes at least one of FDR assist indication information that represents whether it is available to operate as the FDR member by participating in the group, information that represents an operation method in the FDR mode or information related to an FDR grouping method.

4. The method of claim 1, wherein the control message further includes information related to an FDR grouping.

5. The method of claim 1, further comprising:
    receiving, from the BS, system information that includes the FDR capability information of the BS,
    wherein the FDR capability information of the UE is transmitted through a Radio Resource Control (RRC) connection establishment procedure.

6. The method of claim 5, wherein the FDR capability information of the UE is included in an RRC connection request message or an RRC connection setup complete message.

7. The method of claim 6, wherein the FDR capability information of the UE is included in UE capability information.

8. The method of claim 1, further comprising:
    receiving, from the BS, system information that includes the FDR capability information of the BS,
    wherein the FDR capability information of the UE is transmitted through a UE capability negotiation procedure.

9. The method of claim 1, further comprising:
    driving an FD grouping timer related to receiving the information of the group when the UE receives a response for requesting of performing the FDR operation; and
    terminating the FD grouping timer, when a termination condition of the FD grouping timer is satisfied.

10. The method of claim 9, wherein the termination condition of the FD grouping timer is a reception of the information of the group, an expiration of the FD grouping timer or an expiration of a Radio Resource Control (RRC) related timer, and
    wherein the UE drives the RRC related timer, when transmitting a message for requesting of performing the FDR operation.

* * * * *